US008612134B2

(12) United States Patent
Zheng et al.

(10) Patent No.: US 8,612,134 B2
(45) Date of Patent: *Dec. 17, 2013

(54) MINING CORRELATION BETWEEN LOCATIONS USING LOCATION HISTORY

(75) Inventors: Yu Zheng, Beijing (CN); Lizhu Zhang, Beijing (CN); Xing Xie, Beijing (CN)

(73) Assignee: Microsoft Corporation, Redmond, WA (US)

( * ) Notice: Subject to any disclaimer, the term of this patent is extended or adjusted under 35 U.S.C. 154(b) by 396 days.

This patent is subject to a terminal disclaimer.

(21) Appl. No.: 12/711,130

(22) Filed: Feb. 23, 2010

(65) Prior Publication Data

US 2011/0208425 A1    Aug. 25, 2011

(51) Int. Cl.
*G01C 21/00*      (2006.01)
(52) U.S. Cl.
USPC ............................ 701/400; 701/467; 705/7.34
(58) Field of Classification Search
USPC .................................. 701/400, 467; 705/7.34
See application file for complete search history.

(56) References Cited

U.S. PATENT DOCUMENTS

| | | | |
|---|---|---|---|
| 5,428,546 | A | 6/1995 | Shah et al. |
| 6,023,241 | A | 2/2000 | Clapper |
| 6,091,359 | A | 7/2000 | Geier |
| 6,128,279 | A | 10/2000 | O'Neil et al. |
| 6,351,775 | B1 | 2/2002 | Yu |
| 6,385,539 | B1 | 5/2002 | Wilson et al. |
| 6,446,121 | B1 | 9/2002 | Shah et al. |
| 6,496,814 | B1 | 12/2002 | Busche |
| 6,513,026 | B1 | 1/2003 | Horvitz et al. |
| 6,606,643 | B1 | 8/2003 | Emens et al. |
| 6,611,881 | B1 | 8/2003 | Gottfurcht et al. |
| 6,625,319 | B1 | 9/2003 | Krishnamachari |
| 6,724,733 | B1 | 4/2004 | Schuba et al. |
| 6,732,120 | B1 | 5/2004 | Du |
| 6,785,704 | B1 | 8/2004 | McCanne |

(Continued)

FOREIGN PATENT DOCUMENTS

| | | |
|---|---|---|
| EP | 1087602 A2 | 3/2001 |
| GB | 2421653 | 6/2006 |
| WO | WO2006097907 A2 | 9/2006 |
| WO | WO2009053411 A | 4/2009 |

OTHER PUBLICATIONS

"Recommending Personalized Scenic Itinerary With Geo-Tagged Photos" by Chih Hua Tai et al., published between Jun. 23, 2008 and Apr. 26, 2008.*

(Continued)

*Primary Examiner* — Luna Champagne
(74) *Attorney, Agent, or Firm* — Lee & Hayes, PLLC

(57) ABSTRACT

Techniques describe determining a correlation between identified locations to recommend a location that may be of interest to an individual user. The process constructs a location model to identify locations. To construct the model, the process uses global positioning system (GPS) logs of geospatial locations collected over time and identifies trajectories representing trips of the individual user and extracts stay points from the trajectories. Each stay point represents a geographical region where the individual user stayed over a time threshold within a distance threshold. A location history is formulated for the individual user based on a sequence of the extracted stay points to identify locations.

The process determines a correlation between identified locations. The process integrates travel experiences of individual users who have visited the locations in a weighted manner and identifies a common travel sequence which the individual users followed between the locations.

20 Claims, 11 Drawing Sheets

(56) References Cited

U.S. PATENT DOCUMENTS

| | | | |
|---|---|---|---|
| 6,816,779 B2 | 11/2004 | Chen et al. | |
| 6,904,160 B2 | 6/2005 | Burgess | |
| 6,981,055 B1 | 12/2005 | Ahuja et al. | |
| 7,003,555 B1 | 2/2006 | Jungck | |
| 7,013,517 B2 | 3/2006 | Kropf | |
| 7,062,562 B1 | 6/2006 | Baker et al. | |
| 7,111,061 B2 | 9/2006 | Leighton et al. | |
| 7,136,932 B1 | 11/2006 | Schneider | |
| 7,152,118 B2 | 12/2006 | Anderson, IV et al. | |
| 7,155,456 B2 | 12/2006 | Abbott, III et al. | |
| 7,171,415 B2 | 1/2007 | Kan et al. | |
| 7,194,552 B1 | 3/2007 | Schneider | |
| 7,228,359 B1 | 6/2007 | Monteiro | |
| 7,233,861 B2 | 6/2007 | Van Buer et al. | |
| 7,284,051 B1 | 10/2007 | Okano et al. | |
| 7,349,768 B2 | 3/2008 | Bruce et al. | |
| 7,366,726 B2 | 4/2008 | Bellamy et al. | |
| 7,395,250 B1 | 7/2008 | Aggarwal et al. | |
| 7,437,239 B2 | 10/2008 | Serre | |
| 7,447,588 B1 | 11/2008 | Xu et al. | |
| 7,479,897 B2 | 1/2009 | Gertsch et al. | |
| 7,493,294 B2 | 2/2009 | Flinn et al. | |
| 8,060,462 B2 | 2/2009 | Flinn et al. | |
| 7,519,690 B1 | 4/2009 | Barrow et al. | |
| 7,548,936 B2 | 6/2009 | Liu et al. | |
| 7,561,959 B2 | 7/2009 | Hopkins et al. | |
| 7,574,508 B1 | 8/2009 | Kommula | |
| 7,584,159 B1 * | 9/2009 | Chakrabarti et al. | 706/45 |
| 7,584,301 B1 | 9/2009 | Joshi | |
| 7,603,233 B2 | 10/2009 | Tashiro | |
| 7,610,151 B2 | 10/2009 | Letchner et al. | |
| 7,660,441 B2 | 2/2010 | Chen et al. | |
| 7,685,422 B2 | 3/2010 | Isozaki et al. | |
| 7,706,964 B2 | 4/2010 | Horvitz et al. | |
| 7,707,314 B2 | 4/2010 | McCarthy et al. | |
| 7,710,984 B2 | 5/2010 | Dunk | |
| 7,739,040 B2 | 6/2010 | Horvitz | |
| 7,840,407 B2 | 11/2010 | Strope et al. | |
| 7,904,530 B2 | 3/2011 | Partridge et al. | |
| 7,948,400 B2 | 5/2011 | Horvitz et al. | |
| 7,984,006 B2 | 7/2011 | Price | |
| 7,991,879 B2 | 8/2011 | Josefsberg et al. | |
| 8,117,138 B2 * | 2/2012 | Apte et al. | 706/12 |
| 8,135,505 B2 * | 3/2012 | Vengroff et al. | 701/24 |
| 8,190,649 B2 | 5/2012 | Bailly | |
| 2002/0032689 A1 | 3/2002 | Abbott, III et al. | |
| 2002/0038360 A1 | 3/2002 | Andrews et al. | |
| 2002/0044690 A1 | 4/2002 | Burgess | |
| 2002/0077749 A1 | 6/2002 | Doi | |
| 2003/0053424 A1 | 3/2003 | Krishnamurthy et al. | |
| 2003/0063133 A1 | 4/2003 | Foote et al. | |
| 2003/0069893 A1 | 4/2003 | Kanai et al. | |
| 2003/0069968 A1 | 4/2003 | O'Neil et al. | |
| 2003/0139898 A1 | 7/2003 | Miller et al. | |
| 2003/0229697 A1 | 12/2003 | Borella | |
| 2004/0039798 A1 | 2/2004 | Hotz et al. | |
| 2004/0073640 A1 | 4/2004 | Martin et al. | |
| 2004/0198386 A1 | 10/2004 | Dupray | |
| 2004/0217884 A1 | 11/2004 | Samadani et al. | |
| 2004/0264465 A1 | 12/2004 | Dunk | |
| 2005/0004903 A1 | 1/2005 | Tsuda | |
| 2005/0031296 A1 | 2/2005 | Grosvenor | |
| 2005/0075116 A1 | 4/2005 | Laird et al. | |
| 2005/0075782 A1 | 4/2005 | Torgunrud | |
| 2005/0108261 A1 | 5/2005 | Glassy et al. | |
| 2005/0198286 A1 | 9/2005 | Xu et al. | |
| 2005/0225678 A1 | 10/2005 | Zisserman et al. | |
| 2005/0265317 A1 | 12/2005 | Reeves et al. | |
| 2005/0278371 A1 | 12/2005 | Funk et al. | |
| 2006/0020597 A1 | 1/2006 | Keating et al. | |
| 2006/0036630 A1 | 2/2006 | Gray | |
| 2006/0075139 A1 | 4/2006 | Jungck | |
| 2006/0090122 A1 | 4/2006 | Pyhalammi et al. | |
| 2006/0095540 A1 | 5/2006 | Anderson et al. | |
| 2006/0101377 A1 | 5/2006 | Toyama et al. | |
| 2006/0129675 A1 | 6/2006 | Zimmer et al. | |
| 2006/0143442 A1 | 6/2006 | Smith | |
| 2006/0156209 A1 | 7/2006 | Matsuura et al. | |
| 2006/0190602 A1 | 8/2006 | Canali et al. | |
| 2006/0200539 A1 | 9/2006 | Kappler et al. | |
| 2006/0212217 A1 | 9/2006 | Sheha et al. | |
| 2006/0224303 A1 | 10/2006 | Hayashi | |
| 2006/0224773 A1 | 10/2006 | Degenaro et al. | |
| 2006/0251292 A1 | 11/2006 | Gokturk et al. | |
| 2006/0266830 A1 | 11/2006 | Horozov et al. | |
| 2007/0005419 A1 * | 1/2007 | Horvitz et al. | 705/14 |
| 2007/0016663 A1 | 1/2007 | Weis | |
| 2007/0041393 A1 | 2/2007 | Westhead et al. | |
| 2007/0064633 A1 | 3/2007 | Fricke | |
| 2007/0064715 A1 | 3/2007 | Lloyd et al. | |
| 2007/0088974 A1 | 4/2007 | Chandwani et al. | |
| 2007/0100776 A1 | 5/2007 | Shah et al. | |
| 2007/0118668 A1 | 5/2007 | McCarthy et al. | |
| 2007/0127833 A1 | 6/2007 | Singh | |
| 2007/0226004 A1 | 9/2007 | Harrison | |
| 2008/0016051 A1 | 1/2008 | Schiller | |
| 2008/0016233 A1 | 1/2008 | Schneider | |
| 2008/0076451 A1 | 3/2008 | Sheha et al. | |
| 2008/0086574 A1 | 4/2008 | Raciborski et al. | |
| 2008/0201074 A1 | 8/2008 | Bleckman et al. | |
| 2008/0215237 A1 | 9/2008 | Perry | |
| 2008/0235383 A1 | 9/2008 | Schneider | |
| 2008/0268876 A1 | 10/2008 | Gelfand et al. | |
| 2008/0319660 A1 | 12/2008 | Horvitz et al. | |
| 2008/0319974 A1 | 12/2008 | Ma et al. | |
| 2009/0005987 A1 | 1/2009 | Vengroff et al. | |
| 2009/0019181 A1 | 1/2009 | Fang et al. | |
| 2009/0063646 A1 | 3/2009 | Mitnick | |
| 2009/0083128 A1 | 3/2009 | Siegel | |
| 2009/0083237 A1 | 3/2009 | Gelfand et al. | |
| 2009/0100018 A1 | 4/2009 | Roberts | |
| 2009/0138188 A1 | 5/2009 | Kores et al. | |
| 2009/0213844 A1 | 8/2009 | Hughston | |
| 2009/0216435 A1 | 8/2009 | Zheng et al. | |
| 2009/0216704 A1 | 8/2009 | Zheng et al. | |
| 2009/0222581 A1 | 9/2009 | Josefsberg et al. | |
| 2009/0228198 A1 | 9/2009 | Goldberg et al. | |
| 2009/0239552 A1 | 9/2009 | Churchill et al. | |
| 2009/0282122 A1 | 11/2009 | Patel et al. | |
| 2009/0326802 A1 | 12/2009 | Johnson | |
| 2010/0004997 A1 * | 1/2010 | Mehta et al. | 705/14.66 |
| 2010/0010991 A1 | 1/2010 | Joshi | |
| 2010/0070171 A1 | 3/2010 | Barbeau et al. | |
| 2010/0076968 A1 * | 3/2010 | Boyns et al. | 707/732 |
| 2010/0082611 A1 | 4/2010 | Athsani et al. | |
| 2011/0022299 A1 | 1/2011 | Feng et al. | |
| 2011/0029224 A1 | 2/2011 | Chapman et al. | |
| 2011/0130947 A1 | 6/2011 | Basir et al. | |
| 2011/0184949 A1 * | 7/2011 | Luo | 707/737 |
| 2011/0280453 A1 | 11/2011 | Chen et al. | |
| 2011/0302209 A1 | 12/2011 | Flinn et al. | |
| 2012/0030029 A1 | 2/2012 | Flinn et al. | |
| 2012/0030064 A1 | 2/2012 | Flinn et al. | |

OTHER PUBLICATIONS

Ahern, et al., "World Explorer: Visualizing Aggregate Data From Unstructured Text in Geo-Referenced Collections", In the Proceedings of the 7th ACM/IEEE-CS Joint Conference on Digital Libraries, 2007, pp. 1-10.

Graham, "GPS Gadgets Can Reveal More Than Your Location", Retrieved on Nov. 28, 2011 at <<http://www.google.com/#sclient=psy-ab&hl=en&source=hp&q=Graham%2C+GPS+Gadgets+Can+Reveal+More+Than+Your+Location&pbx=1&oq=Graham%2C+GPS+Gadgets+Can+Reveal+More+Than+Your+Location%22%2C+&aq=f&aqi=&aql=&gs_sm=d&gs_upl=287016708l0l10140l21l0l0l0l0l1266l4381l0.1.1l12l0&bav=on.2,or.r_gc.r_pw.,cf.osb&fp=533a712cc6ce8ba0&biw=1280&bih=808>>, 2008, pp. 1-2.

Hariharan, et al., "Project Lachesis: Parsing and Modeling Location Histories", ACM, In the Proceedings of GIScience, 2004, pp. 106-124.

Office Action for U.S. Appl. No. 12/562,588, mailed on Dec. 8, 2011, Yu Zheng, "Mining Life Pattern Based on Location History", 31 pgs.

(56) References Cited

OTHER PUBLICATIONS

Schofield, "It's GeoLife, Jim, But Not as we Know it", Guardian News, Retrieved on Nov. 28, 2011 at <<http://www.guardian.co.uk/technology/2008/mar/13/microsoft.research/print>>, Mar. 12, 2008, 2 pgs.

Ye, et al., "Mining Individual Life Pattern Based on Location History," Tenth International Conference on Mobile Data Management: Systems, Services and Middleware, May 18-20, 2009, Taipei, 10 pages.

Zheng, et al., "Searching Your Life on Web Maps", Microsoft Research, Available at <<http://research.microsoft.com/en-us/people/yuzheng/searching_your_life_over_web_maps.pdf>>, 2008, 4 pgs.

Borzsonyi, et al., The Skyline Operator, In Proc. ICDE 2001, IEEE Press: 421-430, <<http://ieeexplore.ieee.org/stamp/stamp.jsp?tp=&arnumber=914855>>.

Brauckhoff, et al., Applying PCA for Traffic Anomaly Detection: Problems and Solutions, IEEE, 2009, 5 pages.

Brkic, et al., Generative modeling of spatio-temporal traffic sign trajectories, Proceedings of the IEEE Conference on Computer Vision and Pattern Recognition, 2010, pp. 25-31, <<http://www.zemris.fer.hr/~ssegvic/pubs/brkic10ucvp.pdf>>.

Bu, et al., Efficient Anomaly Monitoring Over Moving Object Trajectory Streams, KDD 2009, ACM, 2009, 9 pages.

Chen, et al., GLS-SOD: A Generalized Local Statistical Approach for Spatial Outlier Detection, Proceedings of KDD 2010, ACM, 2010, pp. 1069-1078.

Cranshaw, et al., Bridging the Gap between the Physical Location and Online Social Networks, In Proc. Ubicomp 2010, ACM Press (2010), <<http://www.eng.tau.ac.il/~eran/papers/Cranshaw_Bridging_the_Gap.pdf>>.

Das, et al., Anomaly Detection and Spatial-Temporal Analysis of Global Climate System, Proceedings of SensorKDD 2009, 9 pages, 2009 ACM.

Eagle, et al., Community Computing: Comparisons between Rural and Urban Societies using Mobile Phone Data, IEEE Social Computing, 144-150, <<http://reality.media.mit.edu/pdfs/Eagle_community.pdf>>.

Eagle, et al., Reality mining: sensing complex social systems. Personal Ubiquitous Computing, 10, 4: 255-268, 2006. <<http://robotics.usc.edu/~sameera/CS546/readings/eagle_uc2006.pdf>>.

Estkowski, No Steiner Point Subdivision Simplification is NP-Complete, In Proceedings of the 10th Canadian Conference on Computational Geometry, pp. 11-20, 1998.

Ge, et al., An Energy-Efficient Mobile Recommender System. In Proc. KDD 2010, ACM Press 2010, <<http://pegasus.rutgers.edu/~kelixiao/papers/An%20Energy-Efficient%20Mobile%20Recommender%20System.pdf>>.

Ge, et al., TOP-EYE: Top-k Evolving Trajectory Outlier Detection, Proceedings of CIKM 2010, Toronto, Canada, 4 pages.

Guehnemann, et al., Monitoring traffic and emissions by floating car data. Institute of transport studies Australia; 2004, <<http://elib.dlr.de/6675/1/its_wp_04-07.pdf>>.

Hirose, et al., Network Anomaly Detection based on Eigen Equation Compression, In Proceedings of the 15th SIGKDD Conference on Knowledge Discovery and Data Mining, pp. 1185-1194, 2009 ACM. <<http://www.ibis.t.u-tokyo.ac.jp/yamanishi/ID361_Network_Anomaly_Detection.pdf>>.

Kindberg, et al., Urban computing. Pervasive computing. IEEE Computer Society. 6, 3, pp. 18-20. Aug. 2007, <<http://ieeexplore.ieee.org/stamp/stamp.jsp?tp=&arnumber=4287439&userType=inst>>.

Kostakos, et al., Urban computing to bridge online and real-world social networks. Handbook of Research on Urban Informatics, 2008, <<http://hci.uma.pt/courses/ubicomp/papers/social/kostakos-08.pdf>>.

Lakhina, et al., Diagnosing Network-Wide Traffic Anomalies, In Proceedings of the SIGCOMM 2004 Conference, 12 pages, 2004 ACM.

Lee, et al., Trajectory Clustering: A Partition-and-group Framework, In Proceedings of the 26th ACM SIGMOD International Conference on Management of Data 2007, pp. 593-604, 2007.

Li, et al., Temporal Outlier Detection in Vehicle Traffic Data, Proceedings of the 2009 IEEE International Conference on Data Engineering, pp. 1319-1322, <<http://www.cs.uiuc.edu/~hanj/pdf/icde09_xli.pdf>>.

Liao, et al., Anomaly Detection in GPS Data Based on Visual Analytics, Proceedings of the 2010 IEEE Symposium, Oct. 2010, pp. 51-58, <<http://web.siat.ac.cn/~baoquan/papers/GPSvas.pdf>>.

Lippi, et al., Collective Traffic Forecasting, Proceedings of the European Conference on Machine Learning and Principles and Practice of Knowledge Discovery Database, ECML PKDD 2010, pp. 259-273, 2010.

Liu, et al., Uncovering cabdrivers' behavior patterns from their digital traces, Computers, Environment and Urban Systems, 2010.

Lozano, et al., Spatial-temporal Causal Modeling for Climate Change Attribution, KDD 2009, Paris France, ACM 2009, 10 pages.

Nzouonta, et al, VANET Routing on City Roads using Real-Time Vehicular Traffic Information, IEEE Transactions on Vehicular Technology, vol. 58, No. 7, Sep. 2009, <<http://web.njit.edu/~gwang/publications/TVT09.pdf>>.

Office Action for U.S. Appl. No. 12/037,347, mailed on Aug. 17, 2011, Yu Zheng, "System for Logging Life Experiences Using Geographic Cues", 9 pgs.

Pelekis, et al., Unsupervised Trajectory Sampling, Proceedings of the European Conference on Machine Learning and Principles and Practice of Knowledge Discovery in Databases ECML PKDD 2010, pp. 17-33, 2010.

Ringberg, et al., Sensitivity of PCA for Traffic Anomaly Detection, SIGMETRICS 2007, pp. 109-120.

Rosenfeld, Connectivity in digital pictures. Journal of the ACM (JACM), 17(1):160, 1970.

Rosenfeld, Connectivity in digital pictures, Journal of the ACM 17 (1): pp. 146-160, 1970.

Shekhar, et al., Unified approach to detecting spatial outliers, University of Helsinki 2007, 27 pages, <<http://www.cs.helsinki.fi/u/leino/opetus/spatial-k07/maksimainen.pdf>>.

Shklovski, et al., Urban Computing-Navigating Space and Context. IEEE Computer Society. 39 ,9, pp. 36-37, 2006 <<http://www.itu.dk/people/irsh/pubs/UrbanComputingIntro.pdf>>.

Sun, et al., On Local Spatial Outliers, Technical Report No. 549, Jun. 2004, <<http://sydney.edu.au/engineering/it/research/tr/tr549.pdf>>, 9 pages.

Wu, et al., Spatio-Temporal Outlier Detection in Precipitation Data, Knowledge Discovery from Sensor Data, pp. 115-133, 2010, <<http://sydney.edu.au/engineering/it/~ewu1/publications/WuLiuChawlaSensorKDD2008.pdf>>.

Yan, et al., Discovery of frequent substructures, Wiley-Interscience, 2007, 99-113.

Yuxiang, et al., Detecting Spatio-temporal Outliers in Climate Dataset: A Method Study, IEEE 2005, pp. 760-763.

Zhang, et al., iBAT: Detecting Anomalous Taxi Trajectories from GPS Traces, Proceedings of UbiComp Sep. 2011, 10 pages.

Zhang, et al., Network Anomography, Usenix Association, Internet Measurement Conference 2005, pp. 317-330.

Zheng, et al., GeoLife: A Collaborative Social Networking Service among User, Location and Trajectory. IEEE Date Engineer Bulletin, 33(2). IEEE press 2010, 32-40, <<http://sites.computer.org/debull/A10june/geolife.pdf>>.

Zheng, et al., Recommending friends and locations based on individual location history. In ACM Transaction on the Web, 2011, 44 pages, <<http://research.microsoft.com/pubs/122435/RecomFriend-zheng-Published.pdf>>.

Zheng, et al., T-Drive: Driving Directions based on Taxi Trajectories, In Proc. ACM SIGSPATIAL GIS 2010. ACM Press , 2010, 10 pages, <<http://www.cse.unt.edu/~huangyan/6350/paperList/T-Drive.pdf>>.

Ziebart, et al., Navigate like a cabbie: Probabilistic reasoning from observed context-aware behavior. In Proc. Ubicomp 2008, pp. 322-331, <<http://citeseerx.ist.psu.edu/viewdoc/download?doi=10.1.1.141.7187&rep=rep1&type=pdf>>.

Adomavicius, Tuzhilin, "Toward the Next Generation of Recommender Systems: A Survey of the State-of-the-Art and Possible Extensions", retrieved on Dec. 29, 2009 at <<http://www.inf.unibz.

(56) References Cited

OTHER PUBLICATIONS it/~ricci/ATIS/papers/state-of-the-art-2005.pdf>>, IEEE Transactions on Knowledge and Data Engineering, vol. 17, No. 6, Jun. 2005, pp. 734-749.

Agrawal, et al., "Mining Association Rules between Sets of Items in Large Databases", retrieved on Aug. 4, 2009 at <<http://rakesh.agrawal-family.com/papers/sigmod93assoc.pdf>>, ACM, Proceedings of SIGMOD 1993, 1993, pp. 207-216.

Agrawal, et al., "Mining Sequential Patterns", retrieved on Aug. 4, 2009 at <<http://www.almaden.ibm.com/cs/projects/iis/hdb/Publications/papers/icde95.ps.gz>>, Proceedings of ICDE 1995, 1995, pp. 3-14.

Amato, et al., "Region Based Image Similarity Search Inspired by Text Search", retrieved from the internet at <<http://www.nmis.isti.cnr.it/amato/papers/ircdl07-1.pdf>>.

Brunato, Battiti, "A Location-Dependent Recommender System for the Web", retrieved on Dec. 29, 2009 at <<http://dit.unitn.it/~brunato/pubblicazioni/MobEA.pdf>>, MobEA Workshop, Budapest, May 2003, pp. 1-5.

Cao, et al., "Mining Frequent Spatio-temporal Sequential Patterns", retrieved on Aug. 4, 2009 at <<http://i.cs.hku.hk/~nikos/icdm05.pdf>>, IEEE Computer Society, ICDM 2005, 2005, pp. 82-89.

Datta, et al., "Image Retrieval: Ideas, Influences, and Trends of the New Age", 2008 ACM, retrieved from the internet at <<http://infolab.stanford.edu/~wangz/project/imsearch/review/JOUR/datta.pdf>>.

Deerwester, et al., "Indexing by Latent Semantic Analysis", retrieved from the internet at <<http://citeseerx.ist.psu.edu/viewdoc/download;jsessionid=B056787B1E8B1F013D9FA98930DE10EE?doi=10.1.1.49.7546&rep=rep1&type=pdf>>.

Dubuisson, et al., "A Modified Hausdorff Distance for Object Matching", 1994 IEEE, retrieved from the internet at <<http://ieeexplore.ieee.org/stamp/stamp.jsp?tp=&isnumber=12513&arnumber=576361>>.

Eagle, Pentland, "Reality mining: sensing complex social systems", retrieved on Dec. 29, 2009 at <<http://portal.acm.org/ft_gateway.cfm?id=1122745&type=pdf&coll=GUIDE&dl=GUIDE&CFID=70431904&CFTOKEN=80792866>>, Springer-Verlag London, Personal and Ubiquitous Computing, vol. 10, Issue 4, 2006, pp. 255-268.

Estivill-Castro, Lee, "Data Mining Techniques for Autonomous Exploration of Large Volumes of Geo-referenced Crime Data", retrieved on Dec. 29, 2009 at <<http://citeseer.ist.psu.edu/cache/papers/cs/28670/ftp:zSzzSzftp.cs.newcastle.edu.auzSzpubzSztechreportszSztr2001-09.pdf/estivill-castro01data.pdf>>, Proceedings of Conference on Geocomputation, 2001, pp. 1-12.

Giannotti, et al., "Efficient Mining of Temporally Annotated Sequences", retrieved on Aug. 4, 2009 at <<http://www.siam.org/meetings/sdm06/proceedings/032giannotti.pdf>>, Proceedings of the Sixth SIAM Intl Conference on Data Mining, 2006, pp. 346-357.

Giannotti, et al., "Trajectory Pattern Mining", retrieved on Aug. 4, 2009 at <<http://cs.gmu.edu/~jessica/temp/p330-giannotti.pdf>>, ACM, KDD 2007, 2007, pp. 330-339.

Gonzalez, Hidalgo, Barabasi, "Understanding individual human mobility patterns Supplementary Material", retrieved on Dec. 29, 2009 at <<http://www.barabasilab.com/pubs/CCNR-ALB_Publications/200806-05_Nature-MobilityPatterns/200806-05_Nature-MobilityPatterns-SuppMat13.pdf>>, Nature, vol. 453, 2008, pp. 779-782.

Gustavsen, "Condor—an application framework for mobility-based context-aware applications", retrieved on Aug. 4, 2009 at <<http://www.comp.lancs.ac.uk/~dixa/conf/ubicomp2002-models/pdf/Gustavsen-goteborg%20sept-02.pdf>>, UBICOMP 2002, 2002, pp. 1-6.

Han, et al., "Frequent pattern mining: current status and future directions", retrieved on Aug. 4, 2009 at <<http://www.springerlink.com/content/9p5633hm18x55867/fulltextpdf>>, Springer Science+Business Media, LLC, 2007, pp. 55-86.

Huang, Shekhar, Xiong, "Discovering Co-location Patterns from Spatial Datasets: A General Approach", retrieved on Dec. 29, 2009 at <<http://www.spatial.cs.umn.edu/paper_ps/coloc-tkde.pdf>>, IEEE Transactions on Knowledge and Data Engineering, vol. 16, Issue 12, Dec. 2004, pp. 1472-1485.

Kavouras, et al., "A Method for the Formalization and Integration of Geographic Categorizations", Draft version from the International Journal of Geographic Information Science, 16(5), 439-453, 2002, retrieved from the internet at <<http://ontogeo.ntua.gr/publications/kavouras_kokla_IGIS2002.pdf>>.

Ke, et al., "Correlated Pattern Mining in Quantitative Databases", ACM Transactions on Database Systems, vol. V, No. N, Apr. 2008, pp. 1-44, retrieved from the internet at <<http://www.cse.ust.hk/~wilfred/paper/tods08a.pdf>>.

Ke, et al., "Efficient Correlations Search from Graph Databases", IEEE Transactions on Knowledge and Data Engineering, vol. X, No. X, XXX 200X, retrieved from the internet at <<http://www.cse.ust.hk/~wilfred/paper/tkde08a.pdf>>.

Krumm, et al., "LOCADIO: Inferring Motion and Location from Wi-Fi Signal Strengths", retrieved on Aug. 4, 2009 at <<http://research.microsoft.com/en-us/um/people/horvitz/locadio.pdf>>, Proceedings of Mobiquitous 2004, 2004, pp. 4-13.

Krumm, et al., "Predestination: Inferring Destinations from Partial Trajectories", retrieved on Aug. 4, 2009 at <<http://research.microsoft.com/en-us/um/people/horvitz/predestination.pdf>>, UBICOMP 2006, 2006, pp. 1-18.

Krumm, et al., "Predestination: Where Do You Want to Go Today?", retrieved on Aug. 4, 2009 at <<http://research.microsoft.com/en-us/um/people/horvitz/predestination-ieee.pdf>>, IEEE Computer Magazine, vol. 40, No. 4, Apr. 2007, pp. 105-107.

Lee, et al., "TraClass: Trajectory Classification Using Hierarchical Region-Based and Trajectory-Based Clustering", retrieved on Aug. 4, 2009 at <<http://www.cs.uiuc.edu/homes/hanj/pdf/vldb08_jglee.pdf>>, ACM, VLDB 2008, vol. 1, Issue 1, 2008, pp. 1081-1094.

Lee, et al., "Trajectory Clustering: A Partition-and-Group Framework", retrieved on Aug. 4, 2009 at <<http://www.cs.uiuc.edu/homes/hanj/pdf/sigmod07_jglee.pdf>>, ACM, SIGMOD 2007, 2007, pp. 1-12.

Lee, et al., "Trajectory Outlier Detection: A Partition-and-Detect Framework", retrieved on Aug. 4, 2009 at <<http://www.cs.uiuc.edu/homes/hanj/pdf/icde08_jaegil_lee.pdf>>, IEEE Computer Society, ICDE 2008, 2008, pp. 1-10.

Lemire, Maclachlan, "Slope One Predictors for Online Rating-Based Collaborative Filtering", retrieved on Dec. 29, 2009 at <<http://www.daniel-lemire.com/fr/documents/publications/lemiremaclachlan_sdm05.pdf>>, SIAM Proceedings of Data Mining (SDM), 2005, pp. 1-5.

Li, et al., "Mining User Similarity Based on Location History", retrieved on Aug. 4, 2009 at <<http://portal.acm.org/ft_gateway.cfm?id=1463477&type=pdf&coll=GUIDE&dl=GUIDE&CFID=47485690&CFTOKEN=55940484>>, ACM, GIS 2008, pp. 1-10.

Liao, et al., "Building Personal Maps from GPS Data", retrieved on Aug. 4, 2009 at <<http://luci.ics.uci.edu/predeployment/websiteContent/weAreLuci/biographies/faculty/djp3/LocalCopy/JR-004.pdf>>, Proceedings of IJCAI MOO 2005, 2005, pp. 249-265.

Liao, et al., "Learning and Inferring Transportation Routines", retrieved on Aug. 4, 2009 at <<http://www.cs.rochester.edu/u/kautz/papers/gps-tracking.pdf>>, American Association for Artificial Intelligence, 2004, pp. 1-6.

Mamoulis, Cao, Kollios, Hadjieleftheriou, Tao, Cheung, "Mining, Indexing, and Querying Historical Spatiotemporal Data", retrieved on Dec. 29, 2009 at <<http://i.cs.hku.hk/~nikos/sigkdd2004_1.pdf>>, ACM Proceedings of Conference on Knowledge Discovery and Data Mining (KDD), Aug. 22, 2004, pp. 236-245.

Markowetz, et al., "Design and Implementation of a Geographic Search Engine", Eighth International Workshop on the Web Databases (WebDB 2005), Jun. 16-17, 2005, Baltimore, MD, retrieved from the internet at <<http://cis.poly.edu/suel/papers/geo.pdf>>.

Miyaki, et al., "Tracking Persons Using Particle Filter Fusing Visual and Wi-Fi Localizations for Widely Distributed Camera", retrieved on Aug. 4, 2009 at <<http://ieeexplore.ieee.org/stamp/stamp.jsp?arnumber=04379287>>, IEEE Intl Conference on Image Processing, ICIP 2007, vol. 3, 2007, pp. 225-228.

Monreale, et al., "WhereNext: a Location Predictor on Trajectory Pattern Mining", retrieved Aug. 4, 2009 at <<http://delivery.acm.org/

(56) References Cited

OTHER PUBLICATIONS 10.1145/1560000/1557091/p637-monreale.pdf? key1=1557091&key2=5182739421&coll=GUIDE&dl=GUIDE&CFID=47499709&CFTOKEN=90308932>>, ACM, KDD 2009, 2009, pp. 637-645.

Morimoto, "Mining Frequent Neighboring Class Sets in Spatial Databases", retrieved on Dec. 29, 2009 at <<http://delivery.acm.org/10.1145/510000/502564/p353-morimoto.pdf? key1=502564&key2=1634712621&coll=GUIDE&dl=GUIDE&CFID=70432903&CFTOKEN=93744375>>, ACM Proceedings of Conference on Knowledge Discovery and Data Mining (KDD), 2001, pp. 353-358.

Patterson, et al., "Inferring High-Level Behavior from Low-Level Sensors", retrieved on Aug. 4, 2009 at <<http://www.cs.rochester.edu/u/kautz/papers/High-Level-140.pdf>>, UBICOMP 2003, 2003, pp. 1-18.

Popivanov, et al., "Similarity Search Over Time-Series Data Using Wavelets", Proceedings of the 18th International Conference on Data Engineering (ICDE'02), retrieved from the internet at <<http://infolab.usc.edu/csci599/Fall2003/Time%20Series/Similarity%20search%20over%20time-series%20data%20using%20wavelets.pdf>>.

Rekimoto, et al., "LifeTag: WiFi-based Continuous Location Logging for Life Pattern Analysis", retrieved on Aug. 4, 2009 at <<http://209.85.229.132/search?q=cache:fCil8hzKWxQJ:www.sonycsl.co.jp/person/rekimoto/papers/loca07.pdf+mining+individual+life+pattern+based+on+location+history&cd=5&hl=en&ct=clnk&gl=uk>>, LoCA 2007, 2007, pp. 35-49.

Salton, et al., "A Vector Space Model for Automatic Indexing", Communications of the ACM, Nov. 1975, vol. 18, No. 11, retrieved from the internet at <<http://portal.acm.org/ft_gateway.cfm?id=361220&type=pdf&coll=GUIDE&dl=GUIDE&CFID=46278489&CFTOKEN=41877236>>.

Salton, "Dynamic Document Processing", retrieved from the internet at <<http://portal.acm.org/ft_gateway.cfm?id=361509&type=pdf&coll=GUIDE&dl=GUIDE&CFID=46278306&CFTOKEN=13271377>>.

Sohn, et al., "Mobility Detection Using Everyday GSM Traces", retrieved on Aug. 4, 2009 at <<http://www.placelab.org/publications/pubs/mobility-ubicomp2006.pdf>>, UBICOMP 2006, 2006, pp. 212-224.

Takeuchi, Sugimoto, "An Outdoor Recommendation System based on User Location History", retrieved on Dec. 29, 2009 at <<http://ftp.informatik.rwth-aachen.de/Publications/CEUR-WS/Vol-149/paper14.pdf>>, Proceedings of International Workshop on Personalized Context Modeling and Management for Ubicomp Applications (ubiPCMM), 2005, pp. 91-100.

Tsoukatos, et al., "Efficient Mining of Spatiotemporal Patterns", SSSTD 2001, LNCS 2121, pp. 425-442, 2001, retrieved from the internet at <<http://www.springerlink.com/content/4drejf9h52hk7hv7/fulltext.pdf>>.

Wang, et al., "CLOSET+: Searching for the Best Strategies for Mining Frequent Closed Itemsets", retrieved on Aug. 4, 2009 at <<http://www.cs.umd.edu/~samir/498/wang03closet.pdf>>, ACM, SIGKDD 2003, 2003, pp. 236-245.

Xiao, Xie, Luo, Ma, "Density Based Co-Location Pattern Discovery", retrieved on Dec. 29, 2009 at <<http://www.cse.ust.hk/~xiaoxy/pub/gis-08.pdf>>, ACM Proceedings of Conference on Advances in Geographic Information Systems (SIGSPATIAL), OLAP and co-location mining, Article 29, Nov. 5, 2008, pp. 1-10.

Yan, et al., "Clospan: Mining Closed Sequential Patterns in Large Datasets", retrieved on Aug. 4, 2009 at <<http://citeseerx.ist.psu.edu/viewdoc/download;jsessionid=AFADA02A222CC497F30CEC7317F6C7A5?doi=10.1.1.12.3538&rep=rep1&type=pdf>>, Proceedings of SIAM Int. Conference on Data Mining, SDM 2003, 2003, pp. 166-177.

Yan, et al., "Feature-based Similarity Search in Graph Structures", ACM Transactions on Database Systems, vol. V, No. N, Jun. 2006, retrieved from the internet at <<http://www.cs.ucsb.edu/~xyan/papers/tods06_similarity.pdf>>.

Yavas, et al., "A data mining approach for location prediction in mobile environments", retrieved on Aug. 4, 2009 at <<http://www.cs.bilkent.edu.tr/~oulusoy/dke05.pdf>>, Elsevier B.V., 2004, pp. 121-146.

Zhang, Mamoulis, Cheung, Shou, "Fast Mining of Spatial Collocations", retrieved on Dec. 29, 2009 at <<http://i.cs.hku.hk/~dcheung/publication/sigkdd2004_2.pdf>>, ACM Proceedings of Conference on Knowledge Discovery and Data Mining (SIGKDD), Aug. 22, 2004, pp. 384-393.

Zhang, et al., "Mining Non-Redundant High Order Correlations in Binary Data", PVLDB '08, Aug. 23-28, 2008, Aukland, NZ, retrieved from the internet at <<http://portal.acm.org/ft_gateway.cfm?id=1453981&type=pdf&coll=GUIDE&dl=GUIDE&CFID=46278833&CFTOKEN=66094017>>.

Zhao, et al., "Searching for Interacting Features", retrieved from the internet at <<http://www.public.asu.edu/~huanliu/papers/ijcai07.pdf>>.

Zheng, Wang, Zhang, Xie, Ma, "GeoLife: Managing and Understanding Your Past Life over Maps", retrieved on Dec. 29, 2009 at <<http://research.microsoft.com/en-us/people/yuzheng/zheng-geolife-managing_and_understanding_your_past_life_over_map.pdf>>, IEEE Computer Society, Proceedings of Conference on Mobile Data Manage, 2008, pp. 211-212.

Zheng, et al., "GeoLife2.0: A Location-Based Social Networking Service", retrieved from the internet at <<http://research.microsoft.com/pubs/79441/GeoLife2.0%20A%20Location-Based%20Social%20Networking% 20Service.pdf>>.

Zheng, Liu, Wang, Xie, "Learning Transportation Mode from Raw GPS Data for Geographic Applications on the Web", retrieved on Dec. 29, 2009 at <<http://delivery.acm.org/10.1145/1370000/1367532/p247-zheng.pdf?key1=1367532&key2=0674712621&coll=GUIDE&dl=GUIDE&CFID=68817993&CFTOKEN=12068153>>, ACM Proceeding of Conference on World Wide Web (WWW), Mobility, Apr. 21, 2008, pp. 247-256.

Zheng, et al., "Mining Interesting Locations and Travel Sequences from GPS Trajectories", retrieved on Aug. 4, 2009 at <<http://www2009.eprints.org/80/1/p791.pdf>>, ACM, WWW 2009, 2009, pp. 791-800.

Zheng, Li, Chen, Xie, Ma, "Understanding Mobility Based on GPS Data", retrieved on Dec. 29, 2009 at <<http://delivery.acm.org/10.1145/1410000/1409677/p312-zheng.pdf?key1=1409677&key2=0364712621&coll=GUIDE&dl=GUIDE&CFID=70433597&CFTOKEN=93582958>>, ACM Proceedings of Conference on Ubiquitous Computing (UbiComp), vol. 344, Sep. 21, 2008, pp. 312-321.

Abowd et al., "Cyberguide: A mobile context-aware tour guide", Wireless Networks, vol. 3, retrieved on Apr. 30, 2010 at <<http://graphics.cs.columbia.edu/courses/mobwear/resources/p421-abowd-97.pdf>>, Oct. 1997, pp. 421-433.

Aizawa, et al., "Capture and Efficient Retrieval of Life Log", available at least as early as Nov 16, 2007, at <<http://www.ii.ist.i.kyoto-u.ac.jp/~sumi/pervasive04/program/Aizawa.pdf>>, In Pervasive 2004 Workshop on Memory and Sharing of Experiences, Apr. 2004, 6 pgs.

Aizawa, "Digitizing Personal Experiences: Capture and Retrieval of Life Log", at <<http://ieeexplore.ieee.org/iel5/9520/30168/01385968.pdf?arnumber=1385968 >>, Proceedings of the 11th International Multimedia Modelling Conference (MMM'05), Jan. 2005, pp. 1 (abstract).

Allen, "Dredging-up the Past: Lifelogging, Memory and Surveillance", retrieved at <<http://lsr.nellco.org/cgi/viewcontent.cgi?article=1177&context=upenn/wps>>, University of Pennsylvania Law School, 2007, pp. 50.

Ankerst et al., "OPTICS: Ordering Points to Identify the Clustering Structure", Proceedings of the ACM SIGMOD 1999 International Conference on Management of Data, Philadelphia, Pennsylvania, retrieved Apr. 30, 2010 at <<http://www.dbs.informatik.uni-muenchen.de/Publicationen/Papers/OPTICS.pdf>>, Jun. 1-3, 1999, 12 pages.

Belussi, et al, "Estimating the Selectivity of Spatial Queries Using the 'Correlation' Fractal Dimension", retrieved on Apr. 15, 2010 at

(56) References Cited

OTHER PUBLICATIONS

<<http://www.vldb.org/conf/1995/P299.PDF>>, Proceedings of Conference on Very Large Data Bases (VLDB), Sep. 1995, pp. 299-310.
"Bikely Reviews", website, 2010, 1 page, retrieved on Apr. 16, 2010 at <<http://www.bikely.com/>>.
bing.com, Maps, Retrieved on Dec. 28, 2009 at <<http://cn.bing.com/ditu/>>, 2 pgs.
Bohm, "A Cost Model for Query Processing in High Dimensional Data Spaces", retrieved on Apr. 15, 2010 at <<http://www.dbs.informatik.uni-muenchen.de/~boehm/publications/tods-modeling.final.pdf>>, ACM Transactions on Database Systems, Jun. 2000, pp. 1-43.
Brakatsoulas, et al., "On Map-Matching Vehicle Tracking Data", VLDB Endowment, In the Proceedings of the 31st International Conference on Very Large Data Bases, Sep. 2005, pp. 853-864.
Cai, "Indexing Spatio-Temporal Trajectories with Chebyshev Polynomials", retrieved on Apr. 15, 2010 at <<http://www.cs.ubc.ca/~rng/psdepository/sigmod2004.pdf>>, ACM, Conference on Management of Data, Jun. 13-18, 2004, pp. 599-610.
Chan, et al, "Efficient Time Series Matching by Wavelets", retrieved on Apr. 15, 2010 at <<http://infolab.usc.edu/csci599/Fall2003/Time%20Series/Efficient%20Time%20Series%20Matching%20by%20Wavelets.pdf>>, IEEE Computer Society, Proceedings of Conference on Data Engineering (ICDE), Mar. 1999, pp. 126-133.
Chawathe, "Segment-Based Map Matching", In the Proceedings of the IEEE Intelligent Vehicles Symposium, Jun. 13-15, 2007, pp. 1190-1197.
Chen et al., "GeoTV: Navigating Geocoded RSS to Create an IPTV Experience", Proceedings of the 16th International World Wide Web Conference (WWW 2007), Banff, Alberta, Canada, May 8-12, 2007, pp. 1323-1324, retrieved Apr. 30, 2010 at <<http://www2007.org/posters/poster1042.pdf>>.
Chen, et al, "On the Marriage of Lp-norms and Edit Distance", retrieved on Apr. 15, 2010 at <<http://www.google.co.in/url?sa=t&source=web&ct=res&cd=3&ved=0CBEQFjAC&url=http%3A%2F%2Fciteseerx.ist.psu.edu%2Fviewdoc%2Fdownload%3Fdoi%3D10.1.1.1.7443%26rep%3Drep1%26type%3Dpdf&rct=j&q=On+the+marriage+of+lp-norms+and+edit+distance&ei=_ezGS62IE439__Aa1qlzZDA&usg=AFQjCNHFZScVkE4uy1b_oC-Pr4ur7KIBdQ>>, Proceedings of Conference on Very Large Data Bases (VLDB), Aug. 29-Sep. 3, 2004, pp. 792-803.
Chen, et al, "Robust and Fast Similarity Search for Moving Object Trajectories", retrieved on Apr. 15, 2010 at <<http://citeseerx.ist.psu.edu/viewdoc/download;jsessionid=2C0EAC347F5F144727996F29CEFD49FB?doi=10.1.1.94.8191&rep=rep1&type=pdf>>, ACM, Conference on Management of Data, Jun. 2005, pp. 491-502.
Chen et al., "Searching Trajectories by Locations—An Efficiency Study", 2010 Microsoft Research, to be presented at the ACM Conference on Management of Data (SIGMOD), Indianapolis, Indiana, Jun. 6-11, 2010, 12 pages, retrieved on Apr. 16, 2010 at <<http://www.itee.uq.edu.au/~zxf/_papers/sigmod299-chen.pdf>>.
Ding et al, "Querying and Mining of Time Series Data: Experimental Comparison of Representations and Distance Measures", retrieved on Apr. 15, 2010 at <<http://www.vldb.org/pvldb/1/1454226.pdf>>, VLDB Endowment, PVLDB'08, Aug. 23-28, 2008, pp. 1542-1552.
Faloutsos et al, "Fast Subsequence Matching in Time-Series Databases," Proceedings of the 1994 ACM SIGMOD International Conference on Management of Data , vol. 23, No. 2, Jun. 1994, 11 pgs.
Frentzos et al, "Algorithms for Nearest Neighbor Search on Moving Object Trajectories", retrieved on Apr. 15, 2010 at <<http://infolab.cs.unipi.gr/pubs/journals/FGPT06-Geoinformatica.pdf>>, Kluwer Academic Publishers, Geoinformatica, vol. 11, No. 2, Jun. 2007, pp. 1-32.
Frentzos et al, "Index-based Most Similar Trajectory Search", retrieved on Apr. 15, 2010 at <<http://isl.cs.unipi.gr/pubs/TR/UNIPI-ISL-TR-2006-01.pdf>>, IEEE Conference on Data Engineering (Technical Report UNIPI-ISL-TR-2006-01), Jun. 2006, pp. 1-12.
Goldberg, et al., "Computing the Shortest Path: A Search Meets Graph Theory", SODA'05 Proceedings of the Sixteenth Annual ACM-SIAM Symposium on Discrete Algorithms, Jan. 2005, pp. 156-165, 10 pgs.
Gonzalez, et al., "Adaptive Fastest Path Computation on a Road Network: A Traffic Mining Approach", ACM, In the Proceedings of the 33rd International Conference on Very Large Data Bases, Sep. 23-28, 2007, pp. 794-805.
"GPS Track Route Exchange Forum", 2010 GPSXchange.com website, 3 pages, retrieved on Apr. 16, 2010 at <<http://www.gpsxchange.com/phpBB2/index.php>>.
"GPS-Waypoints", retrieved on Apr. 15, 2010 at <<http://www.gps-waypoints.net/>>, 2010, pp. 1.
Greenfeld, "Matching GPS Observations to Locations on a Digital Map", In the Proceedings of the 81st Annual Meeting of the Transportation Research Board, Washington DC, Jan. 2002, 13 pgs.
Gutman, "Reach-Based Routing: A New Approach to Shortest Path Algorithms Optimized for Road Networks", In the Proceedings of the Sixth Workshop on Algorithm Engineering and Experiments and the First Workshop on Analytic Algorithmics and Combinatorics, New Orleans, LA, USA, Jan. 10, 2004, 12 pgs.
Guttman, "R-Trees: A Dynamic Index Structure for Spatial Searching", retrieved on Apr. 15, 2010 at <<http://www.google.co.in/url?sa=t&source=web&ct=res&cd=1&ved=0CAcQFjAA&url=http%3A%2F%2Fciteseerx.ist.psu.edu%2Fviewdoc%2Fdownload%3Fdoi%3D10.1.1.66.1675%26rep%3Drep1%26type%3Dpdf&rct=j&q=R-trees%3A+a+dynamic+index+structure+for+spatial+searching&ei=JfTGS6uRPJH0__AaCpICHDQ&usg=AFQjCNFtQUNVHCKYJQZcH052-KmCx1Z0g>>, ACM, Proceedings of Conference on Management of Data,1984, pp. 47-57.
Hart, et al., "A Formal Basis for the Heuristic Determination of Minimum Cost Paths", In the Proceedings of IEEE Transactions of Systems Science and Cybernetics, vol. 4, No. 2, Feb. 12, 2007 (First Publication 1968), pp. 100-107.
Hjaltason, Samet, "Distance Browsing in Spatial Databases", retrieved on Apr. 15, 2010 at <<http://citeseerx.ist.psu.edu/viewdoc/download?doi=10.1.1.25.4224&rep=rep1&type=pdf>>, ACM Transactions on Database Systems, vol. 24, No. 2, Jun. 1999, pp. 265-318.
Horozov et al., "Using Location for Personalized POI Recommendations in Mobile Environments", Proceedings of the 2006 International Symposium on Applications and the Internet (SAINT 2006), Phoenix, Arizona, Jan. 23-27, 2006, pp. 124-129.
Huang, et al., "Project Report (draft version) Spatial Outlier Detection", retrieved on Dec. 12, 2008 at <<http://www-users.cs.umn.edu/~joh/csci8715/P6.pdf>>, Computer Science Department, University of Minnesota, 2004, pp. 1-8.
Jan, Horowitz, Peng, "Using GPS Data to Understand Variations in Path Choice", retrieved on Apr. 15, 2010 at <<https://pantherfile.uwm.edu/horowitz/www/pathchoice.pdf>>, National Research Council, Transportation Research Record 1725, 2000, pp. 37-44.
Jing, et al., "Hierarchical Optimization of Optimal Path Finding for Transportation Applications", (University of Michigan Research Paper, 1996, pp. 269-276) in the Proceedings of the Fifth International Conference on Informaton and Knowledge Management, 1996, pp. 261-268.
Kanoulas, Du, Xia, Zhang, "Finding Fastest Paths on a Road Network with Speed Patterns", retrieved on Dec. 24, 2009 at <<http://www.inf.unibz.it/dis/teaching/SDB/paper/kanoulasDXZ_icde06_fastestpath.pdf>>, IEEE Computer Society, Proceedings of Conference on Data Engineering (ICDE), 2006, pp. 1-10.
Kharrat, Popa, Zeitouni, Faiz, "Clustering Algorithm for Network Constraint Trajectories", retrieved on Apr. 15, 2010 at <<http://www.prism.uvsq.fr/~karima/papers/SDH_08.pdf>>, Springer Berlin, Symposium on Spatial Data Handling (SDH), 2008, pp. 631-647.
Korn, Pagel, Faloutsos, "On the 'Dimensionality Curse' and the 'Self-Similarity Blessing'", retrieved on Apr. 15, 2010 at <<http://www.informedia.cs.cmu.edu/documents/korn_dimcurse_2001.

(56) References Cited

OTHER PUBLICATIONS pdf>>, IEEE Educational Activities Department, Transactions on Knowledge and Data Engineering, vol. 13, No. 1, Jan. 2001, pp. 96-111.

Kou, et al., "Spatial Weighted Outlier Detection", retrieved on Dec. 12, 2008 at <<http://www.siam.org/proceedings/datamining/2006/dm06_072kouy.pdf>>, SIAM Conference on Data Mining, 2006, pp. 614-618.

Lavondes, et al., "Geo::PostalAddress—Country-specific postal address parsing/formatting", retrieved on Dec. 16, 2008 at <<http://search.cpan.org/~pauamma/Geo-PostalAddress-0.04/PostalAddress.pm>>, CPAN, 2004, pp. 1-8.

Li, et al. "A Connectivity-Based Map Matching Algorithm", AARS, Asian Journal of Geoinformatics, 2005, vol. 5, No. 3, pp. 69-76.

Li, et al., "Traffic Density-Based Discovery of Hot Routes in Road Networks", Springer-Verlag, Advances in Spatial and Temporal Databases, 2007, pp. 441-459.

Liao, et al., "Learning and Inferring Transportation Routines", Elsevier, Artificial Intelligence, vol. 171, Issues 5-6, Apr. 2007, pp. 311-331.

Liao et al., "Location-based Activity Recognition", Proceedings of the 19th Annual Conference on Neural Information Processing Systems (NIPS-2005), Whistler, British Columbia, Canada, Dec. 5-10, 2005, 8 pages, retrieved on Apr. 16, 2010 at <<http://books.nips.cc/papers/files/nips18/NIPS2005_0773.pdf>>.

Manning et al., "An Introduction to Information Retrieval", DRAFT, Cambridge University Press, Apr. 1, 2009, 581 pages, retrieved on Apr. 16, 2010 at <<http://nlp.stanford.edu/IR-book/pdf/irbookonlinereading.pdf>>.

Masoud, et al., "Fast Algorithms for Outlier Detection", retrieved on Dec. 12, 2008 at <<http://www.scipub.org/fulltext/jcs/jcs42129-132.pdf>>, Journal of Computer Science, vol. 4, No. 2, 2008, pp. 129-132.

McKeown, et al., "Integrating Multiple Data Representations for Spatial Databases", retrieved on Dec. 12, 2008 at <<http://mapcontext.com/autocarto/proceedings/auto-carto-8/pdf/integrating-multiple-data-representations-for-spatial-databases.pdf>>, Auto Carto 8 Conference Proceedings (ASPRS and ACSM), 1987, pp. 754-763.

Miller, "Analysis of Fastest and Shortest Paths in an Urban City Using Live Vehicle Data from a Vehicle-to-Infrastructure Architecture", retrieved on Dec. 24, 2009 at <<http://www.sigmacoding.com/jeff/publications/fastest-path-ifac09.pdf>>, Federation on Automatic Control Symposium on Control in Transportation Systems (IFAC), Sep. 2009., pp. 1-5.

Morse, Patel, "An Efficient and Accurate Method for Evaluating Time Series Similarity", retrieved on Apr. 15, 2010 at <<http://www.eecs.umich.edu/db/files/sigmod07timeseries.pdf>>, ACM, Proceedings of Conference on Management of Data, Jun. 11, 2007, pp. 569-580.

Nicholson, "Finding the Shortest Route Between Two Points in a Network", British Computer Society, The Computer Journal, 1966, vol. 9, No. 3, pp. 275-280.

Park et al., "Location-Based Recommendation System Using Bayesian User's Preference Model in Mobile Devices", J. Indulska et al. (Eds.): UIC 2007, LNCS 4611, pp. 1130-1139, retrieved on Apr. 30, 2010 at <<http://sclab.yonsel.ac.kr/publications/paper/IC/UIC07-MHPark.pdf>>.

Patterson, et al., "Inferring High-Level Behavior from Low-Level Sensors", Springer-Verlag Berlin Heidelberg, Lecture Notes in Computer Science, International Conference on Ubiquitous Computing, 2003, vol. 2864, pp. 73-89.

Pfoser et al., "Novel Approaches in Query Processing for Moving Object Trajectories", Proceedings of the 26th International Conference on Very Large Data Bases (VLDB 2000), Cairo, Egypt, Sep. 10-14, 2000, pp. 395-406.

Pfoser, et al., "Capturing the Uncertainty of Moving-Object Representations", Springer-Verlag, in the Proceedings of the 6th International Symposium on Advances in Spatial Databases, Lecture Notes in Computer Science, 1999, vol. 1651, pp. 111-131.

Quddus, et al."Current Map-Matching Algorithms for Transport Applications: State-of-the-Art and Future Research Directions", Elsevier Ltd., Transportation Research Part C: Emerging Technologies, 2007, vol. 15, Issue 5, pp. 312-328.

Roussopoulos, Kelley, Vincent, "Nearest Neighbor Queries", retrieved on Apr. 15, 2010 at <<http://www.cs.umd.edu/~nick/papers/nncolor.pdf>>, ACM, Presentation: Conference on Management of Data, 1995, pp. 1-23.

Saltenis, "Outlier Detection Based on the Distribution of Distances between Data Points", retrieved on Dec. 12, 2008 at <<http://www.mii.It/informatica/pdf/INFO558.pdf>>, Informatica, vol. 15, No. 3, 2004, pp. 399-410.

Schonfelder, "Between Routines and Variety Seeking: The Characteristics of Locational Choice in Daily Travel", retrieved on Dec. 12, 2008 at <<http://www.ivt.ethz.ch/vpl/publications/reports/ab192.pdf>>, 10th International Conference on Travel Behaviour Research, Aug. 10-15, 2003, pp. 1-32.

Sellen, et al., "Do Life-Logging Technologies Support Memory for the Past? An Experimental Study Using SenseCam", available at least as early as Nov. 16, 2007, at <<http://research.microsoft.com/sds/papers/SensecamMemCHICamRdy.pdf>>, pp. 10.

"Share My Routes", retrieved on Apr. 15, 2010 at <<http://www.sharemyroutes.com/>>, 2010, pp. 1-2.

Sherkat, Rafiei, "On Efficiently Searching Trajectories and Archival Data for Historical Similarities", retrieved on Apr. 15, 2010 at <<http://webdocs.cs.ualberta.ca/~drafiei/papers/vldb08.pdf>>, VLDB Endowment, Proceedings of Conference on Very Large Data Bases (VLDB), vol. 1, No. 1, Aug. 24, 2008, pp. 896-908.

Simon, Frohlich, "A Mobile Application Framework for the geospatial Web", retrieved on Apr. 16, 2010 at <<http://www2007.org/papers/paper287.pdf>>, ACM, Proceedings of World Wide Web Conference (WWW), May 8, 2007, pp. 381-390.

Singh et al., "Relational Learning via Collective Matrix Factorization", Proceedings of the 14th ACM SIGKDD International Conference on Knowledge Discovery and Data Mining, Las Vegas, Nevada, Aug. 24-27, 2008, pp. 650-658, retrieved on Apr. 30, 2010 at <<http://www.cs.cmu.edu/-ggordon/CMU-ML-08-109.pdf>>.

Srebro et al., "Weighted Low-Rank Approximations", Proceedings of the 20th International Conference on Machine Learning (ICML-2003), Washington, DC, Aug. 21-24, 2003, 8 pages, retrieved on Apr. 30, 2010 at <<http://people.scail.mit.edu/tommi/papers/SreJaa-icml03.pdf>>.

Takeuchi et al., "CityVoyager: An Outdoor Recommendation System Based on User Location History", Proceedings of the 3rd International Conference on Ubiquitous Intelligence and Couputing (UIC 2006), Wuhan, China, Sep. 3-6, 2006, pp. 625-636.

Taylor, et al., "Virtual Differential GPS & Road Reduction Filtering by Map Matching", In the Proceedings of ION'99, Twelfth International Technical Meeting of the Satellite Division of the Institute of Navigation, 1999, pp. 1675-1684.

Vlachos, Kollios, Gunopulos, "Discovering Similar Multidimensional Trajectories", retrieved on Apr. 15, 2010 at <<http://www.google.co.in/url?sa=t&source=web&ct=res&cd=1&ved=0CAcQFjAA&url=http%3A%2F%2Fciteseerx.ist.psu.edu%2Fviewdoc%2Fdownload%3Fdoi%3D10.1.1.106.1984%26rep%3Drep1%26type%3Dpdf&rct=j&q=Discovering+similar+multidimensional+trajectories&ei=ivfGS6HCM4uj_ga3wOiBDQ&usg=AFQjCNG20j6K3s_WuY-VhWeDjIPYpgxv1Q>>, IEEE Computer Society, Proceedings of Conference on Data Engineering (ICDE), 2002, pp. 673-684.

Wang et al., "An Optimized Location-based Mobile Restaurant Recommend and Navigation System", WSEAS Transactions on Information Science and Applications, vol. 6, Issue 5, May 2009, pp. 809-818, retrieved on Apr. 16, 2010 at <<http://www.wseas.us/e-library/transactions/information/2009/29-186.pdf>>.

Wang et al., "Unifying User-based adn Item-based Collaborative Filtering Approaches by Similarity Fusion", Proceedings of the 29th Annual International ACM SIGIR Conference on Research and Development in Information Retrieval, Seattle, Washington, Aug. 6-11, 2006, pp. 501-508, retrieved on Apr. 30, 2010 at <<http://ict.ewi.tudelft.nl/pub/jun/sigir06_similarityfuson.pdf>>.

Ward et al., "Unsupervised Activity Recognition Using Automatically Mined Common Sense", American Association for Artificial

(56) References Cited

OTHER PUBLICATIONS

Intelligence (AAAI 2005), Proceedings of the 20th National Conference on Artificial Intelligence, Pittsburgh, Pennsylvania, Jul. 9-13, 2005, 7 pages, retrieved Apr. 30, 2010 at <<http://www.cs.dartmouth,edu/-tanzeem/pubs/AAA1051WyattD.pdf>>.

Winogard, "Dynamic Cartograms for Navigating Geo-referenced Photographs", available at least as early as Nov. 16, 2007, at <<http://cs.stanford.edu/research/project.php?id=289>>, pp. 2.

Xie, Zheng, "GeoLife: Building social networks using human location history", retrieved on Apr. 15, 2010 at <<http://research.microsoft.com/en-us/projects/geolife/>>, Microsoft Corporation, 2010, pp. 1-8.

Xue, "Efficient Similarity Search in Sequence Databases", retrieved on Apr. 15, 2010 at <<http://www.cs.uwaterloo.ca/~david/cs848/presentation-similarity-fengxue.pdf>>, University of Waterloo, Ontario Canada, Course Paper: CS 860 Topics in Database Systems, Nov. 18, 2009, pp. 1-7.

Yi, Jagadish, Faloutsos, "Efficient Retrieval of Similar Time Sequences under Time Warping", retrieved on Apr. 15, 2010 at <<http://www.google.co.in/url?sa=t&source=web&ct=res&cd=3&ved=0CBYQFjAC&url=http%3A%2F%2Fciteseerx.ist.psu.educ%2Fviewdoc%2Fdownload%3Fdoi%3D10.1.1.105.6211%26rep%3Drep1%26type%3Dpdf&rct=j&q=Efficient+retrieval+of+similar+time+sequences+under+time+warping&ei=4ffGS5ShA4_0_Aalk5z8DA&usg=AFQjCNEkCq5vQwgb6OQfZmT_RWcgMZ2YNA>>, IEEE Computer.

Zheng et al., "Collaborative Filtering Meets Mobile Recommendation: A User-centered Approach", to be presented at the Association for the Advancement of Artificial Intelligence (AAAI) 24th Conference on Artificial Intelligence, Atlanta, Georgia, Jul. 11-15, 2010, 6 pages., retrieved on Apr. 16, 2010 at <<http://research.microsoft.com/pubs/122244/AAAI10-Collaborative%20Filtering%20Meets%20Mobile%20Recommendation%20A%20User-centered%20Approach.pdf>>.

Zheng, et al., "GeoLife: Managing and Understanding Your Past Life over Maps", IEEE Computer Society, In the Proceedings of the Ninth International Conference on Mobile Data Management, 2008, pp. 211-212, 2 pgs.

Zheng et al., "Joint Learning User's Activities and Profiles from GPS Data", ACM Geographic Information Systems Workshop on Location Based Social Networks (ACM LBSN 2009), Seattle, Washington, Nov. 3, 2009, pp. 17-20, retrieved on Apr. 16, 2010 at <<http://delivery.acm.org/10.1145/1630000/1629894/p17-zheng.pdf?key1=1629894&key2=6324041721&coll=GUIDE&dl=GUIDE&CFID=86381688&CFTOKEN=49903381>>.

Zheng et al., "Microsoft GeoLife Project, GeoLife: Building social networks using human location history", Microsoft Research, 2009, 4 pages, retrieved on Apr. 16, 2010 at <<http://research.microsoft.com/en-us/projects/geolife/default.aspx>>.

Zheng et al., "Recommending Friends and Locations Based on Individual Location History", ACM Trans. Asian Language Information Processing, vol. 6, No. 3, Article 9, Ch. 45, Nov. 2007, 47 pages, retrieved on Apr. 16, 2010 at <<http://research.microsoft.com/pubs/122435/Recommending%20friends%20and%20locations%20based%20on%20individual%20location%20history.pdf>>.

Min-qi, et al., "An Algorithm for Spatial Outlier Detection Based on Delaunay Triangulation", In the Proceedings of the 2008 International Conference on Computational Intelligence and Security, Dec. 2008, pp. 102-107.

Office Action for U.S. Appl. No. 12/353,940, mailed on Mar. 23, 2012, Yu Zheng, "Detecting Spatial Outliers in a Location Entity Dataset", 6 pgs.

Office Action for U.S. Appl. No. 12/773,771, mailed on Mar. 26, 2012, Yu Zheng, "Collaborative Location and Activity Recommendations", 9 pgs.

Office action for U.S. Appl. No. 12/567,667, mailed on Jul. 18, 2012, Zheng et al., "Recommending Points of Interests in a Region", 20 pages.

Shekhar, et al., "Data Mining for Selective Visualization of Large Spatial Datasets", In the Proceedings of the 14th IEEE International Conference on Tools with Artificial Intelligence, Nov. 2002, pp. 41-48.

Zhang, et al., "A Taxonomy Framework for Unsupervised Outlier Detection Techniques for Multi-Type Data Sets" Technical Report TR-CTIT-07-79, Centre for Telematics and Information Technology University of Twente, Enschede, Nov. 2007, 40 pgs.

Domain Name System (DNS), retrieved on Apr. 29, 2008 at <<http://www.unix.org.ua/orelly/networking/firewall/ch08_10.htm>>, Unix, pp. 1-11.

Domain Name System (DNS) A Guide to TCP/IP, retrieved at <<http://web.syr.edu/~djmolta/ist452/ch_07.ppt>>, Thomson Learning Course Technology, pp. 1-56.

"Flow Control Platform (FCP) Solutions", at <<http://k2colocation.com/network-services/fcp.cfm>>, K2 Colocation, 2005, pp. 2.

"Global Server Load Balancing for Disaster Recovery, Business Continuity, Performance Optimization and Datacenter Management ", at <<http://www.zeus.com/documents/en/ZXT/ZXTM_Global_Load_Balancer.pdf>>, Zeus Technology Limited, 1995-2007, pp. 4.

Linden, "The End of Federated Search?", at <<http://glinden.blogspot.com/2007/03/end-of-federated-search.html>>, Mar. 24, 2007, pp. 9.

Office Action for U.S. Appl. No. 12/041,599, mailed on Jul. 25, 2011, Arne Josefsberg, "Failover in an Internet Location Coordinate Enhanced Domain Name System".

Office action for U.S. Appl. No. 13/188,013, mailed on Nov. 15, 2011, Josefsberg et al., "Internet Location Coordinate Enhanced Domain Name System", 14 pages.

Office action for U.S. Appl. No. 12/353,940, mailed on Feb. 28, 2013, Zheng et al., "Detecting Spatial Outliers in a Location Entity Dataset", 9 pages.

Office Action for U.S. Appl. No. 12/041,599, mailed on Feb. 9, 2012, Arne Josefsberg, "Failover in an Internet Location Coordinate Enhanced Domain Name System", 27 pgs.

Office action for U.S. Appl. No. 12/041,599, mailed on Sep. 21, 2012, Josefsberg et al., "Failover in an Internet Location Coordinate Enhanced Domain Name System", 9 pages.

Park, et al., CoDNS: Improving DNS Performance and Reliability via Cooperative Lookups, retrieved at <<http://www.cs.princeton.edu/nsg/papers/codns_osdi_04/paper.pdf>>, Princeton University, pp. 1-16.

Wikipedia, "Operating System", retrived from <<http://en.wikipedia.org/wiki/Operating_system>> on Oct. 8, 2010, pp. 1-pp. 17.

Yegulalp, Change the Windows 2000 DNS cache, retrieved on Apr. 29, 2008 at <<http://searchwincomputing.techtarget.com/tip/0,289483,sid68_gci1039955,00.html>>, SearchWinComputing.com, pp. 1-3.

The European Search Report mailed Nov. 21, 2012 for European patent application No. 09714738.3, 9 pages.

Office action for U.S. Appl. No. 12/353,940, mailed on Nov. 2, 2012, Zheng et al., "Detecting Spatial Outliers in a Location Entity Dataset", 11 pages.

Office action for U.S. Appl. No. 12/794,538, mailed on Nov. 2, 2011, Zheng et al. "Searching Similar Trajectories by Locations", 10 pages.

Office action for U.S. Appl. No. 12/567,667, mailed on Dec. 19, 2012, Zheng et al., "Recommending Points of Interests in a Region", 18 pages.

Office Action for U.S. Appl. No. 12/712,053, mailed on Aug. 15, 2012, Zheng et al., "Route Computation Based on Route-Oriented Vehicle Trajectories", 17 pages.

Shekhar et al., "A Unified Approach to Detecting Spatial Outliers", GeoInformatica 7:2, 2003, 28 pages.

Shiraishi, "A User-centric Approach for Interactive Visualization and mapping of Geo-sensor Data", Networked Sensing Systems, 2007, INSS, Fourth International Conference on IEEE, Jun. 1, 2007, pp. 134-137.

Spinellis, "Position-Annotated Photographs: A Geotemporal Web", IEEE Pervasive Computing IEEE Service Center, Los Alamintos, CA, vol. 2, No. 2, Apr. 1, 2003, pp. 72-79.

(56) References Cited

OTHER PUBLICATIONS

Sun, "Outlier Detection in High Dimensional, Spatial and Sequential Data Sets", School of Information Technologies, The University of Sydney, Sep. 2006, 118 pages.

Wang et al., "Spatiotemporal Data Modelling and Management: a Survey", Technology of Object-Oriented Languages and Systems, 2000, ASI, Proceedings of the 36th International Conference on Oct. 30-Nov. 4, 2000, IEEE, pp. 202-211.

Weng et al., "Design and Implementation of Spatial-temporal Data Model in Vehicle Monitor-System", Proceeding of the 8th International Conference on Geocomputation, Aug. 3, 2005, pp. 1-8.

\* cited by examiner

U1 TRIP1  902

U2 TRIP2  904

U3 TRIP3  906

MINING CORRELATION BETWEEN LOCATIONS USING LOCATION HISTORY

BACKGROUND

A global positioning system (GPS) tracking unit identifies a location or tracks a movement of a vehicle or a person when the vehicle or the person is in close proximity to a GPS device. The location or movement is recorded via GPS devices or phones. GPS information is utilized in navigation systems. For example, individuals may search for information based on their present GPS location for driving or walking directions to a destination location.

The increasing popularity of location-acquisition technologies and their use in people's lives results in GPS information being collected daily. The data collection includes tracking movements of people or vehicles and their visits to various locations. The GPS data may be uploaded to the Internet by people to show their positions, to share travel experiences, and for a variety of other reasons.

The GPS data in raw form is not usable for a number of reasons. One problem with the data in raw form is that there is no semantic meaning to identify the data. For example, there is no indication of whether the location data is for a lake, a restaurant, or a store.

Another problem occurs when individuals enter a building, which causes a loss of a satellite signal. This loss of the satellite signal makes it difficult to identify whether to include the information.

There is an increasing opportunity to find ways to transform the raw data to a usable form and to use the data collected.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure describes determining a correlation between locations to recommend a location that may be of interest to an individual user. The recommendation is based on location history of individual users. In one aspect, a location correlation service constructs a location model to identify locations with a time-stamp. To construct the model, the location correlation service uses global positioning system (GPS) logs of geospatial locations collected over time. The location correlation service identifies trajectories representing trips of the individual user and extracts stay points from the trajectories. Each stay point represents a geographical region where the individual user stayed over a time threshold within a distance threshold. A location history is formulated for the individual user based on a sequence of the extracted stay points to identify locations.

In another aspect, a location correlation service determines a correlation between identified locations. The location correlation service accesses the location model to identify locations. The location correlation service integrates travel experiences of individual users who have visited the locations in a weighted manner and identifies a common travel sequence which the individual users followed between the locations. Then, the location correlation service calculates the correlation between the identified locations. The correlation recommends locations that may be of interest to other users.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
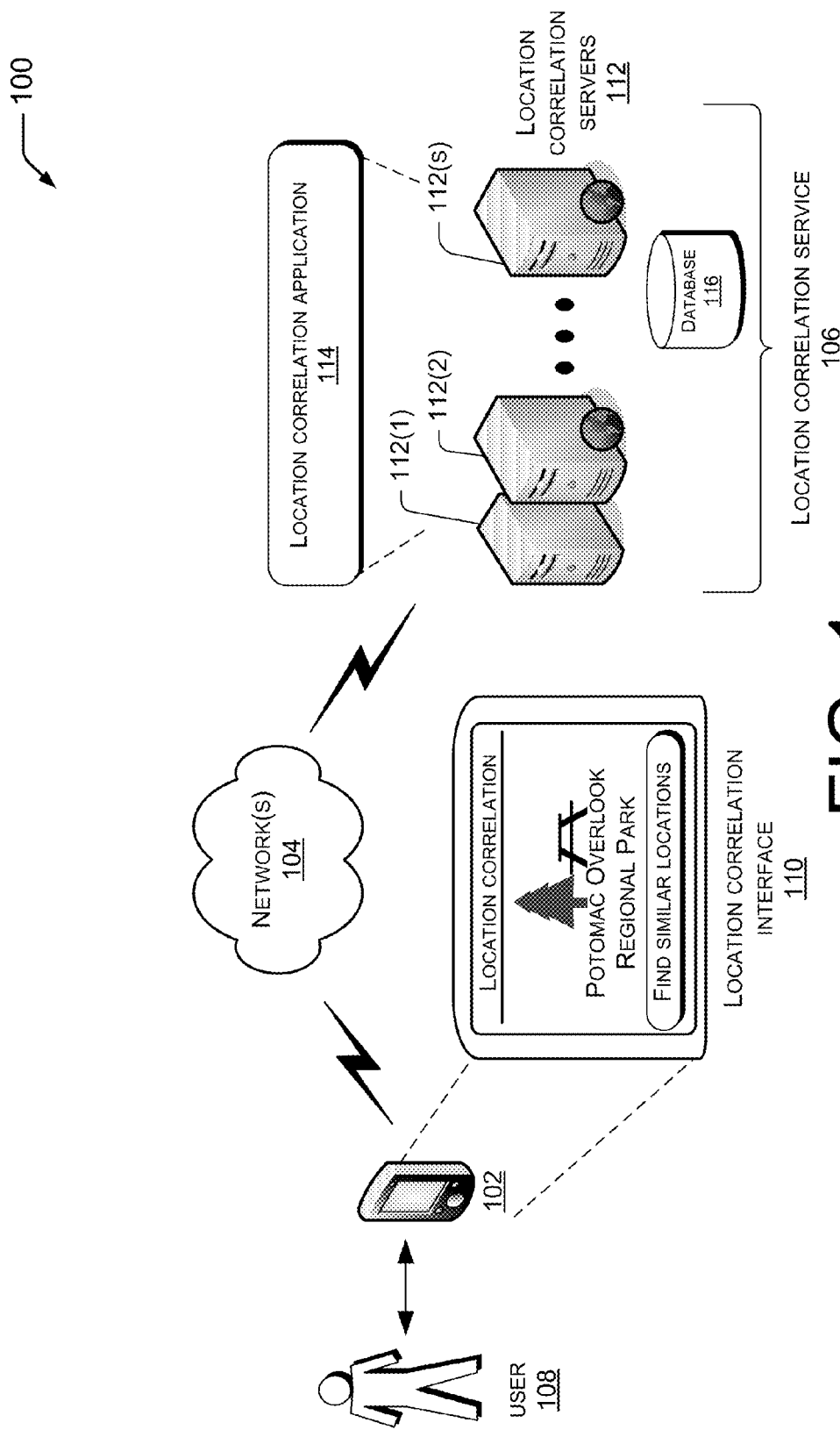
FIG. 1 illustrates an architecture to support an exemplary environment for recommending a location to a user.

This disclosure describes identifying a correlation between locations to recommend a location that may be of interest to an individual user. The recommendation is based at least in part on recorded location histories. In one aspect, the location correlation service constructs a location model to identify the locations. The model is constructed by processing global positioning system (GPS) points that tracked the individual user. The tracking of individual users may be made possible through mobile phones via a global system for mobile communications (GSM) network, which leaves positioning logs with a timestamp of each log point. Furthermore, if there is exposure to a GPS satellite, GPS-enabled devices may record latitude and longitude positions. The logs may also be obtained from geo-related web communities, websites, or forums. For sake of brevity, GPS logs may be used as examples in the discussion, but the data may additionally or alternatively include other location data such as from GSM networks, personal area networks, and the like. The individual users will be given notice of the GPS data collection and have the opportunity to provide or to deny consent for tracking purposes. For example, the individual users may choose to opt-in consent or to opt-out consent.

As previously mentioned, the GPS data is not usable in its raw form. The location correlation service described herein identifies trajectories from the GPS logs to transform the raw data into a usable form to construct the location model. The trajectories represent a single trip for the individual user based on a sequence of time-stamped points. Next, the process extracts stay points from the trajectories. Each stay point represents a geographical region where the individual user has stayed for a predetermined time interval. The process described herein defines a particular semantic meaning for the stay points, such as identifying the stay point as a shopping mall or a restaurant.

Then, the process formulates the individual user's location history based on a sequence of stay points. The individual user's location history data is clustered into clusters to remove a top two clusters of stay points having a greatest number of stay points. Removing the top two clusters of stay points eliminates geographical regions that are private to the individual user, such as the user's home or office.

Furthermore, the location correlation service clusters the stay points from multiple users' trajectories into several geographical regions to identify locations. The clustering is based on a density-based clustering algorithm. Thus, the location model provides valuable meaning to the geographical regions that have been visited by multiple individual users, such as, a set of restaurants, stores along a main street, or an area for tourist attractions.

In another aspect, the location correlation service determines a correlation between identified locations. A location correlation service may access the inference model to infer individual users' travel experiences from their location histories. Based on the model, the process integrates travel experiences of individual users for the locations and identifies a common travel sequence followed between the locations. Then, the location correlation service calculates the correlation between the identified locations. The correlation indicates a relationship between the locations based on human behavior. The location correlation service recommends a location that may be of interest to the user based on the location histories of other users.

While aspects of described techniques can be implemented in any number of different computing systems, environments, and/or configurations, implementations are described in the context of the following exemplary computing environment.

Illustrative Environment

FIG. 1 illustrates an exemplary architectural environment 100, usable to recommend locations that may be of interest to users, based on a correlation between identified locations from a location model. The environment 100 includes an exemplary computing device 102, which is illustrated as a personal digital assistant (PDA). The computing device 102 is configured to connect via one or more network(s) 104 to access a location correlation service 106 for a user 108. The computing device 102 may take a variety of forms, including, but not limited to, a portable handheld computing device (e.g., a personal digital assistant, a smart phone, a cellular phone), a personal navigation device, a laptop computer, a desktop computer, a portable media player, or any other device capable of connecting to one or more network(s) 104 to access the location correlation service 106 for the user 108.

The network(s) 104 represents any type of communications network(s), including wire-based networks (e.g., public switched telephone, cable, and data networks) and wireless networks (e.g., cellular, satellite, WiFi, and Bluetooth).

The location correlation service 106 represents an application service that may be operated as part of any number of online service providers, such as a search engine, map service, social networking site, or the like. Also, the location correlation service 106 may include additional modules or work in conjunction with modules to perform the operations discussed below. In an implementation, the location correlation service 106 may be implemented at least in part by a location application stored in memory of the computing device 102, by an application stored on servers of the location correlation service 106, or both. Updates may be sent for the location application stored on a personal navigation device.

In the illustrated example, the computing device 102 may include a location correlation user interface (UI) 110 that is presented on a display of the computing device 102. The user interface 110 facilitates access to the location correlation service 106 that provides recommendations. In one implementation, the UI 110 is a browser-based UI that presents a page received from the location correlation service 106. The user 108 employs the location correlation UI 110 when viewing a map of a region of interest. The UI 110 may also allow for input of the region of interest by viewing the map. In another implementation, the UI 110 may request and receive input for the region of interest. In an implementation, the location correlation service 106 recommends a location of interest based on the user's present geospatial position. For example, the user interface 110 may display a place of interest, such as "Potomac Overlook Regional Park" to the user 108, based on the user's present geospatial position, a prediction of the user's interest in a location, locations within a threshold, travel time, locations within a predetermined distance from the user's present geospatial location, and/or location histories of other users. The user will be given notice of the GPS tracking their position or location and have the opportunity to provide or to deny consent for tracking purposes. For example, the user may choose to opt-in consent or to opt-out consent.

In the illustrated example, the location correlation service 106 is hosted on one or more location correlation servers, such as server 112(1), 112(2), . . . , 112(S), accessible via the network(s) 104. The location correlation servers 112(1)-(S) may be configured as plural independent servers, or as a collection of servers that are configured to perform larger scale functions accessible by the network(s) 104. The location correlation servers 112 may be administered or hosted by a network service provider that provides the location correlation service 106 to and from the computing device 102.

The location correlation service 106 further includes a location correlation application 114 that executes on one or more of the location correlation servers 112(1)-(S). In an implementation, the location correlation application 114 builds a location model to identify locations, in order to utilize GPS data.

To create the location model, the location correlation application 114 may preprocess the individual user data by collecting global positioning system (GPS) logs. To identify effective individual trips in the geographical locations, the location correlation application 114 identifies or parses trajectories from the logs. The trajectories help transform the raw GPS data to a usable form. The trajectory data is extracted to identify stay points. The extraction of the stay points involves identifying a stay point, which is a geographical region where the individual user has stayed over a time threshold within a distance threshold. The location correlation application 114 helps identify whether to use the stay point as absolute time or to calculate time intervals and associates semantic meaning to the stay points (e.g., whether it is a store or a restaurant). The location correlation application 114 also specifies a location history for the individual user based on a sequence of stay points with corresponding arrival times and departure times. This data is particularly valuable in understanding human behavior.

The location correlation application 114 clusters the stay points based on geographical regions to form clusters of stay points. Then, the location correlation application 114 removes a top two clusters of stay points having a greatest number of stay points to eliminate the geographical regions that are private to the individual user. For example, the location correlation application may remove clusters associated with the user's home and office locations.

Furthermore, the location correlation application 114 groups the stay points from multiple users' trajectories into a dataset and clusters the stay points into several geographical regions. The clusters of stay points from the multiple users' trajectories are used to represent locations. The locations may be further grouped into a trip, which is a sequence of locations that are consecutively visited by the individual user.

After the location model has been constructed, the location correlation service 106 is ready to infer the travel experiences of the individual users based on their location histories. The location correlation service 106 may employ an inference model to evaluate the travel experiences of the individual user. Individual travel experience and location interest have a mutual reinforcement relationship. For example, an individual user with rich travel experiences in a region would visit many interesting places in the region, and a very interesting place in that region may be accessed by many individual users with rich travel experiences. To calculate each individual user's travel experience, the location correlation service 106 builds a matrix for location and user and uses a power iteration method to calculate the travel experiences.

Next, the location correlation service 106 may access the location model to infer individual users' travel experiences from their location histories. Using the model, the process integrates travel experiences of the individual users for the locations and identifies a common travel sequence followed by the individual users between the locations. Then, the location correlation service 106 calculates the correlation between the identified locations. The correlation indicates a relationship between the locations based on human behavior. Based on the correlations, the location correlation service 106 recommends a location to the user.

In the illustration, the user 108 accesses the location correlation service 106 via the network 104 using their computing device 102. The location correlation service 106 presents the user interface (UI) 110 to receive a user query for a location of interest or to provide a recommendation for the location of interest. In an implementation, the user 108 accesses a map for a particular region. Upon activating the particular region on the map, the location correlation service 106 may provide recommendations of locations of interest to the user 108, based on the location correlation results.

In the example illustrated in FIG. 1, the user 108 may receive a location of "Potomac Overlook Regional Park" based on his present geospatial location. Once the location is recommended, the user may submit a query by actuating a button "Find Similar Locations" on the UI 110. Based on the user query, the location correlation application 114 searches the correlation results to find another location.

The environment 100 may include a database 116, which may be stored on a separate server or the representative set of servers 112 that is accessible via the network(s) 104. The database 116 may store information, such as logs for the individuals which include a sequence of global positioning system (GPS) points, a trajectories archive, location models, locations identified by the model, a map generated of locations visited, mined location correlation results, and the like. In this implementation, the location model and the location correlation results are stored in the database 116 and are updated on a predetermined time interval.

Figure 2:
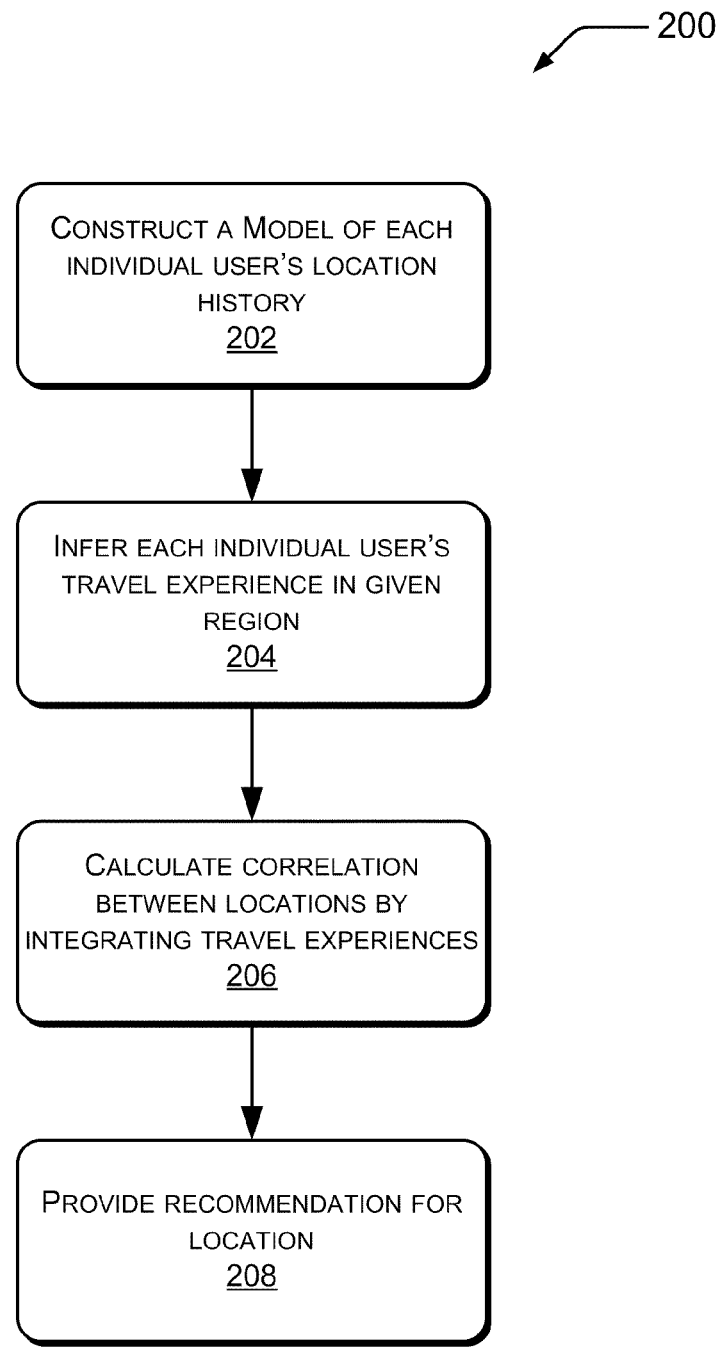
FIG. 2 is a flowchart showing an exemplary of mining correlation between locations, including constructing a location model, inferring each individual user's travel experiences, calculating a correlation between locations, and providing a recommendation.

FIG. 2 is a flowchart showing an exemplary process 200 showing high level functions performed by the location correlation service 106. The process 200 may be divided into four phases, an initial phase to construct a location model 202, a second phase to infer each users' travel experiences 204, a third phase to calculate a correlation between the locations 206, and a fourth phase to recommend a location 208. The phases may be used in the environment of FIG. 1. These phases may be performed separately or in combination.

The first phase is constructing the location model of each individual user's location history 202. The process collects GPS logs of geospatial locations of the individual user. This disclosure describes transforming the GPS data into a form that may be readily used to construct the location model. For example, the location model may be based on identifying trajectories and stay points from logs, associating location histories and locations from stay points, identifying trips and users. The location model may be constructed by the location correlation service 106 or in conjunction with a location model module. Additional details of constructing the location model of each individual user's location history 202 can be found in the discussion of FIGS. 3-5 below.

The second phase, inferring each individual user's travel experience in a given region 204, is performed using an inference model. The process builds an adjacent matrix between the individual users and locations of interest for locations visited by the individual user. The individual user's travel experience and the locations of interest have a mutual reinforcement relationship. Thus, a power iteration process calculates each individual user's travel experience and each location of interest to be used as input for a correlation. Additional details of inferring the travel experiences by using individual user data 204 can be found in the discussion of FIGS. 6 and 7 below.

The third phase, calculating the correlation between the locations by integrating travel experiences 206, uses a location correlation algorithm. The correlation takes into consideration the user's travel experiences and a sequence of the locations in the individual user's trip. Furthermore, the correlation is based on category similarity and the geographical distance between the locations. This information may be stored in the database 116 for easy access by the location correlation service. Additional details of correlating locations by integrating the travel experiences of the users 206 can be found in the discussion of FIG. 8a below.

The fourth phase is to provide a recommendation for a location 208 based on the correlation data between locations. The recommendation may occur when the user is accessing a map of the region, accessing websites, submitting a query, or based on the user's geospatial location. Additional details of recommending a place of interest 208 can also be found in the discussion of FIG. 8b below.

Exemplary Processes

Figure 3:
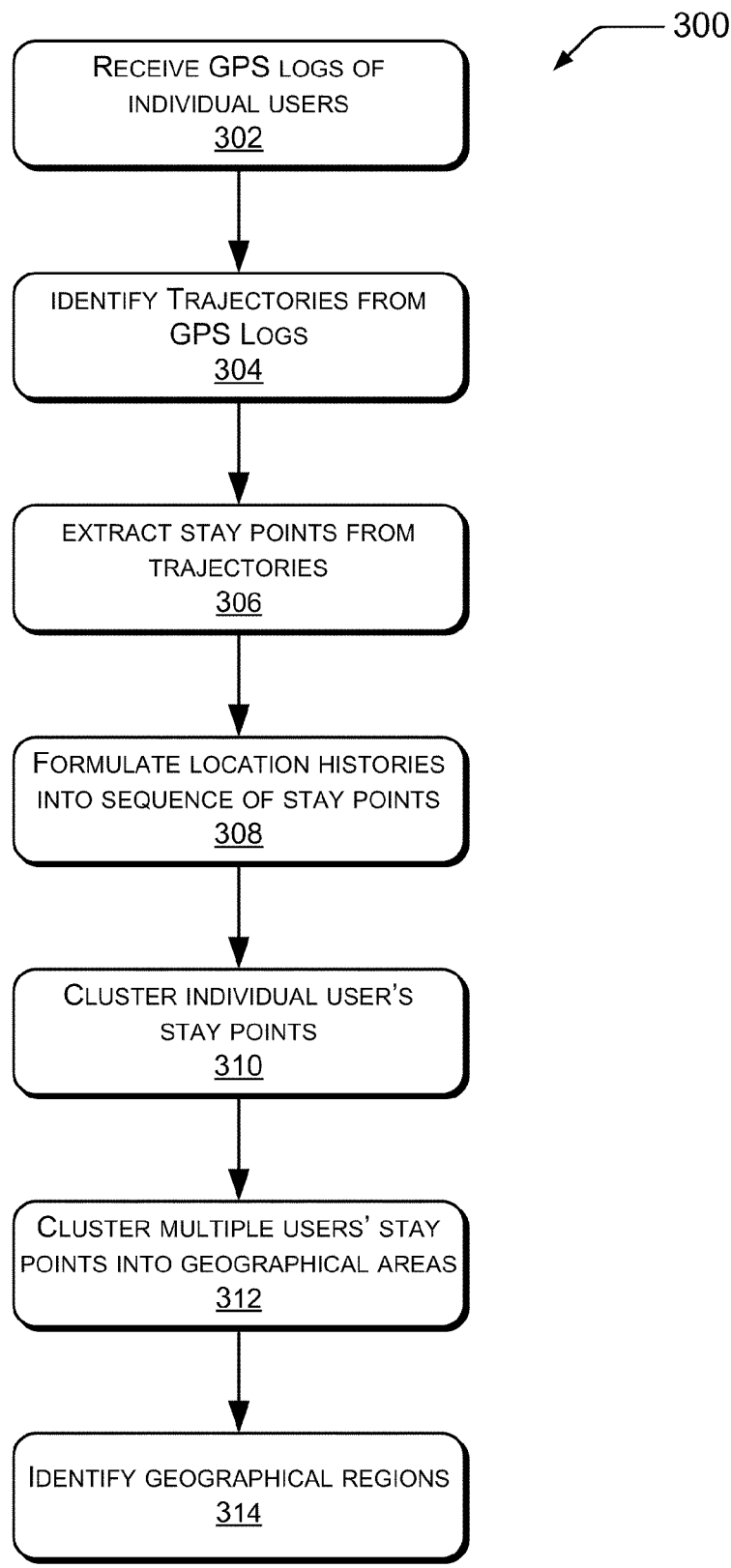
FIG. 3 is a flowchart showing an exemplary process of constructing the location model.
Figure 6:
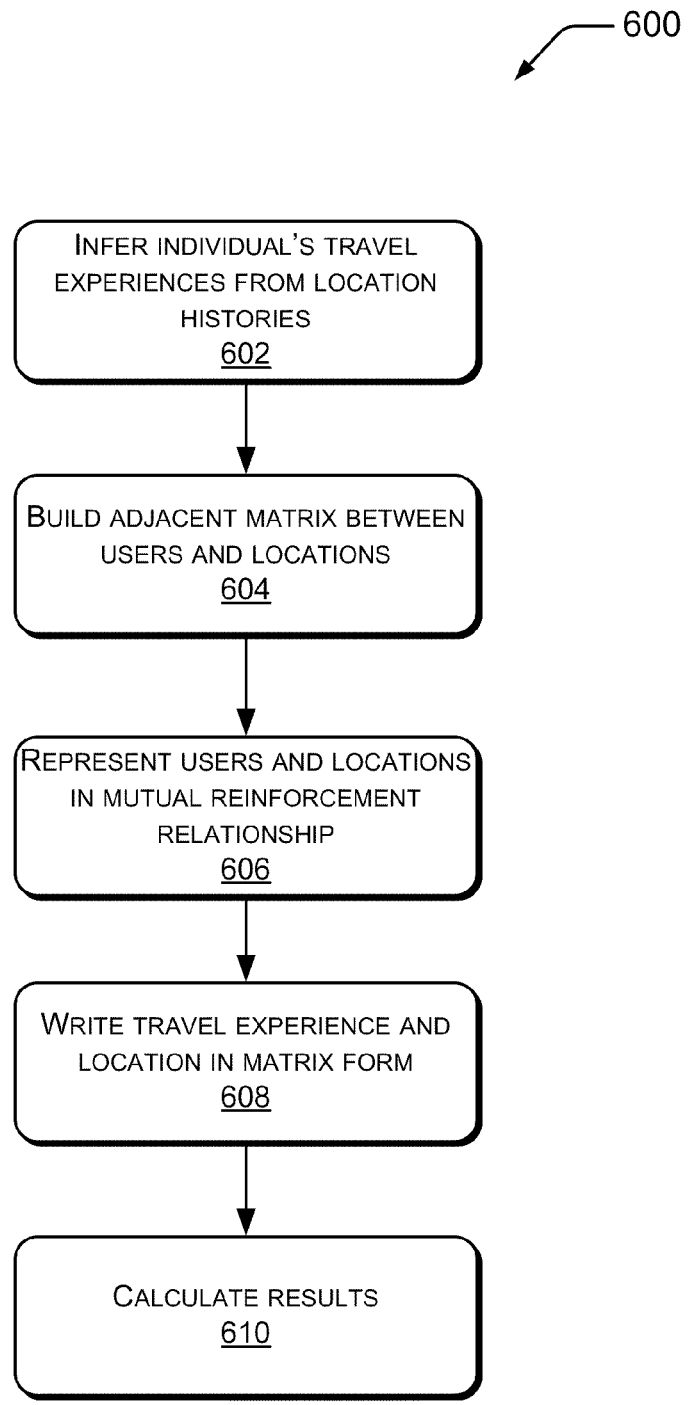
FIG. 6 is a flowchart showing an exemplary process of inferring travel experiences of users from their location histories.
Figure 8A:
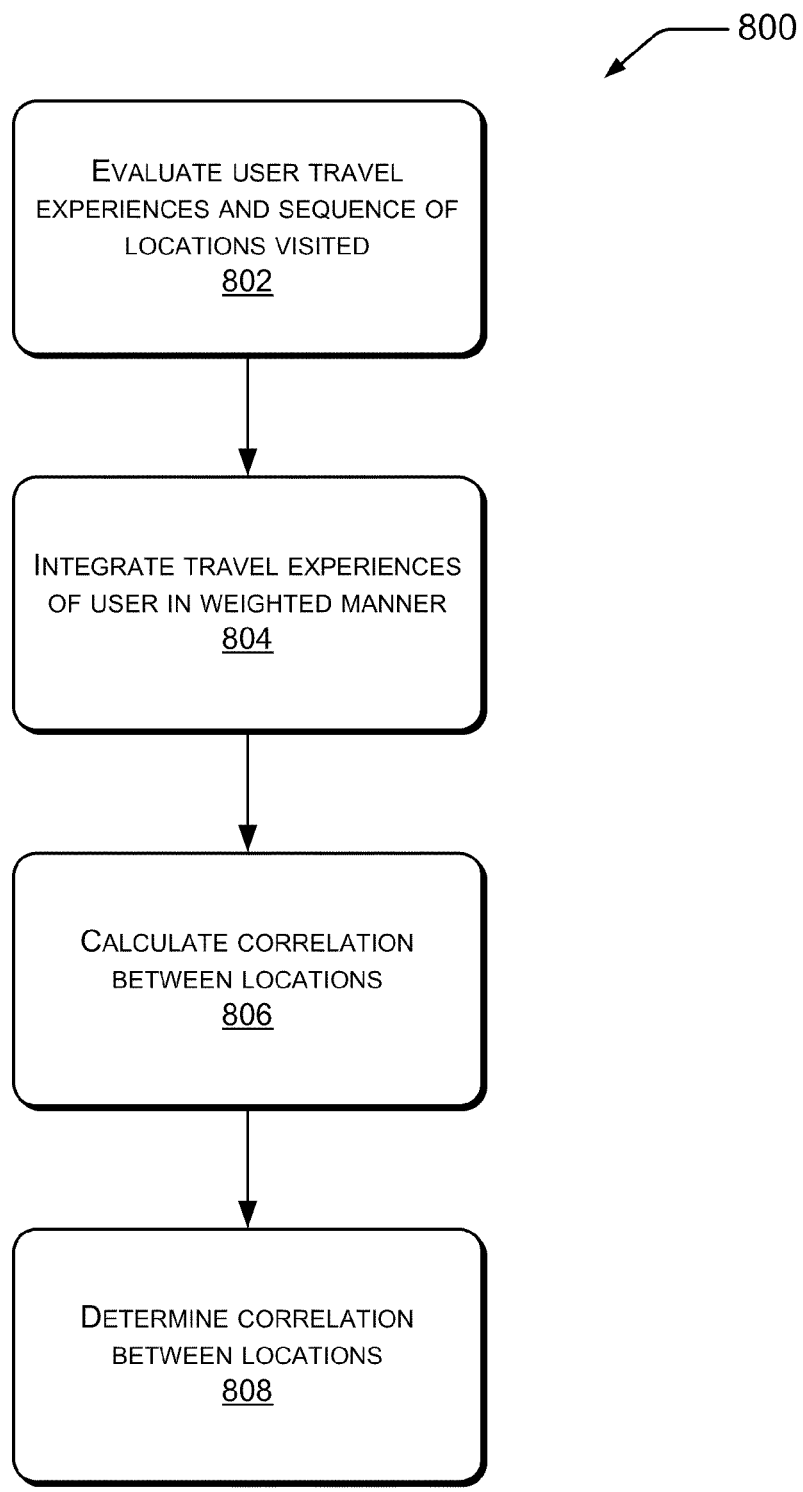
FIG. 8a illustrates a flowchart showing an exemplary process of determining correlations between locations based at least in part on the location histories.

FIGS. 3, 6, and 8a are flowcharts showing exemplary processes for constructing the location model of each individual's location history 202, inferring users' travel experiences from their location histories 204, and calculating a correlation between the locations by integrating the travel experiences of the users 206, respectively. The processes are illustrated as a collection of blocks in logical flowcharts, which represent a sequence of operations that can be implemented in hardware, software, or a combination. For discussion purposes, the processes are described with reference to the computing environment 100 shown in FIG. 1. However, the processes may be performed using different environments and devices. Moreover, the environments and devices described herein may be used to perform different processes.

For ease of understanding, the methods are delineated as separate steps represented as independent blocks in the figures. However, these separately delineated steps should not be construed as necessarily order dependent in their performance. The order in which the process is described is not intended to be construed as a limitation, and any number of the described process blocks may be combined in any order to implement the method, or an alternate method. Moreover, it is also possible for one or more of the provided steps to be omitted.

FIG. 3 is a flowchart illustrating an exemplary process 300 of preprocessing raw GPS data to model each individual user's location history with time-stamped locations. The process 300 constructs a location model by collecting or receiving GPS logs of geospatial locations of individual users 302. The logs may be obtained from GPS sensors, tracking units, mobile phones, or any other device, as long as these devices are located in close proximity to each of the individuals. The GPS log is generally a collection of GPS points, which include a date, a time, a longitude, and a latitude. A GPS log may include a set P of points represented by $P=\{p_1, p_2, \ldots, p_n\}$, where each GPS point $p_i \in P$ contains latitude ($p_i \cdot Lat$), longitude ($p_i \cdot Lngt$) and timestamp ($p_i \cdot T$) values, such as a date and a time.

In an implementation, the location correlation service 106 may obtain GPS logs from GPS-log driven applications on the web. Each individual user may be equipped with a GPS device for tracking data. The device may include a GPS navigation device, a GPS phone, or any other type of GPS sensor that collects GPS log data at a high sampling rate, such as every two to eight seconds per point. The GPS devices may be set to automatically track the position of the device at regular intervals.

As mentioned, a problem with raw GPS data is that it is not in a usable form. In the examples described herein, the raw data from the GPS logs is first transformed into a form that may be readily used to construct the location model. Modeling includes parsing the GPS logs of each individual user to identify trajectories 304. The trajectories are identified from the GPS logs to provide a representation of individual trips for the individual user.

An individual user's trajectory is a sequence of time-stamped points. The trajectory may be represented by:

Traj=$(p_0, p_1, \ldots, p_k)$, where $p_i(x_i, y_i, t_i)$ (i=0, 1, \ldots, k) is a timestamp $\forall 0 \leq i < k$, ti<ti+1, and $(x_i,y_i)$ are two-dimension coordinates of points.

In building the location model, the process extracts stay points from the trajectory of each individual user 306. Each stay point gives semantic meaning to the raw point in the trajectory. For example, the stay point may indicate a store, a restaurant, a school, and the like. The stay point s, represents a geographical region where the individual user stayed over a time period. The time period may be based at least in part on a time threshold ($T_r$) within a distance threshold ($D_r$). In one specific implementation, the time threshold is 20 minutes and the distance threshold is 250 meters. However, in other implementations, other time and distance thresholds may be used. Based on data for the individual user, such as staying over 20 minutes and a distance of 200 meters, the stay point is identified as a geographical region. However, if the data for the individual user indicates that the user stayed about 10 minutes within a distance of 190 meters, there is no stay point detection. In that case, for example, the individual user may be at a street crossing waiting for traffic lights.

Figure 4:
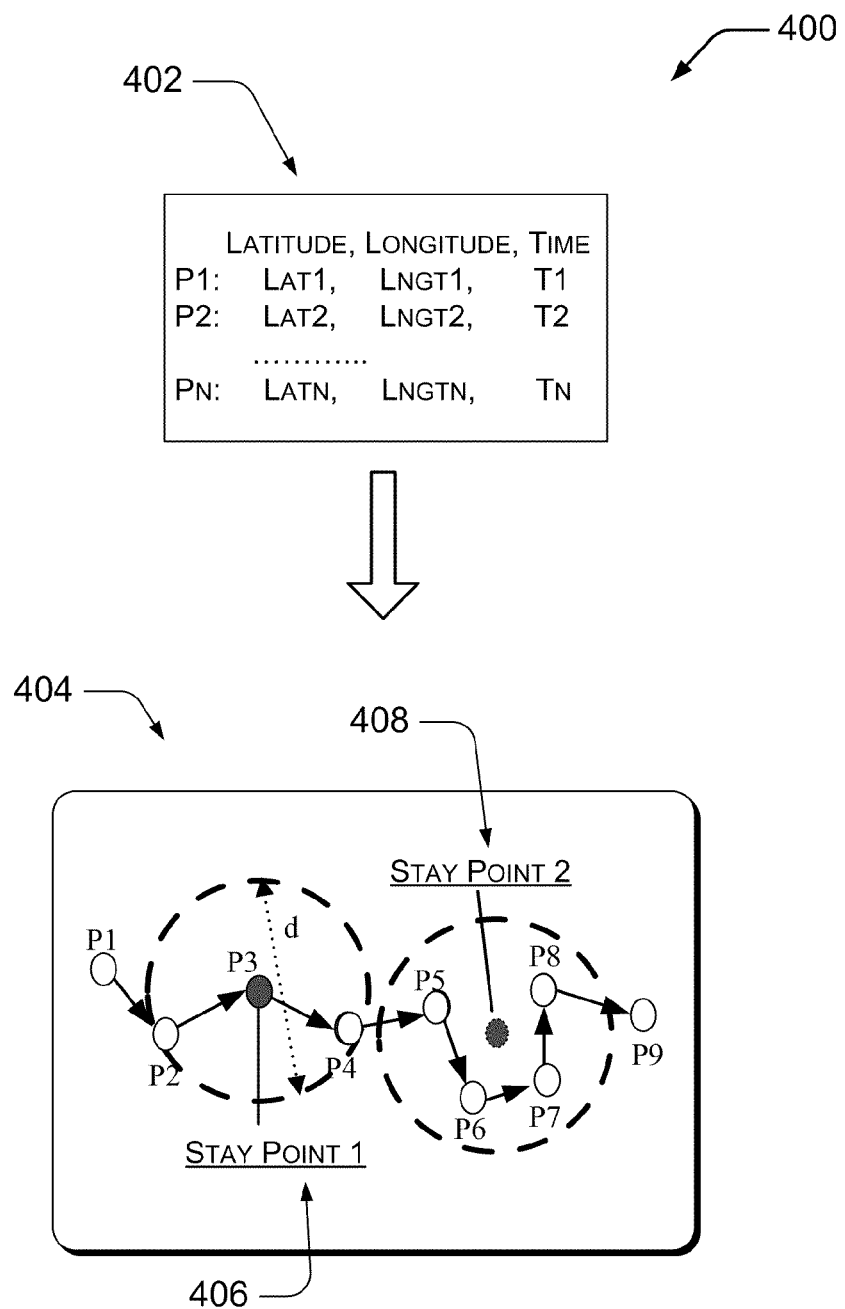
FIG. 4 illustrates an exemplary process of extracting stay points.

In the individual user's trajectory, stay point s, is characterized by a set of consecutive points:

$P=(pm, m+1, \ldots, pn)$, where $\forall m < i \leq n$, Dist(pm, pi)$\leq$Dr, Dist(pm, pn+1)>Dr and Int(pm, pn)$\geq T_r$. Therefore, $s=(x, y, t_a, t_l)$, where:

$$s \cdot x = \sum_{i=m}^{n} p_i \cdot x / |P|,$$

$$s \cdot y = \sum_{i=m}^{n} p_i \cdot y / |P|,$$

respectively stands for the average x and y coordinates of the collection P; $s \cdot t_a = p_m \cdot t_m$ is the individual user's arriving time on s and $s \cdot t_l = p_n \cdot t_n$ represents the individual user's leaving time. A diagram illustrating the GPS log and stay points are shown in FIG. 4.

When stay points are identified, a sequence of stay points is formulated to represent a location history of the individual user 308. Each stay point corresponds to a location visited by the individual user with corresponding arrival and departure times. The individual user's location history, h, is represented by:

$$h = \left\{ s_0 \xrightarrow{\Delta t_1} s_1 \xrightarrow{\Delta t_2}, \ldots, \xrightarrow{\Delta t_{n-1}} s_n \right\} \quad (1)$$

where $\forall 0 \leq i < n$, si is a stay point and $\Delta ti=si+1 \cdot ta-si \cdot tl$ is the time interval between two stay points.

Figure 5:
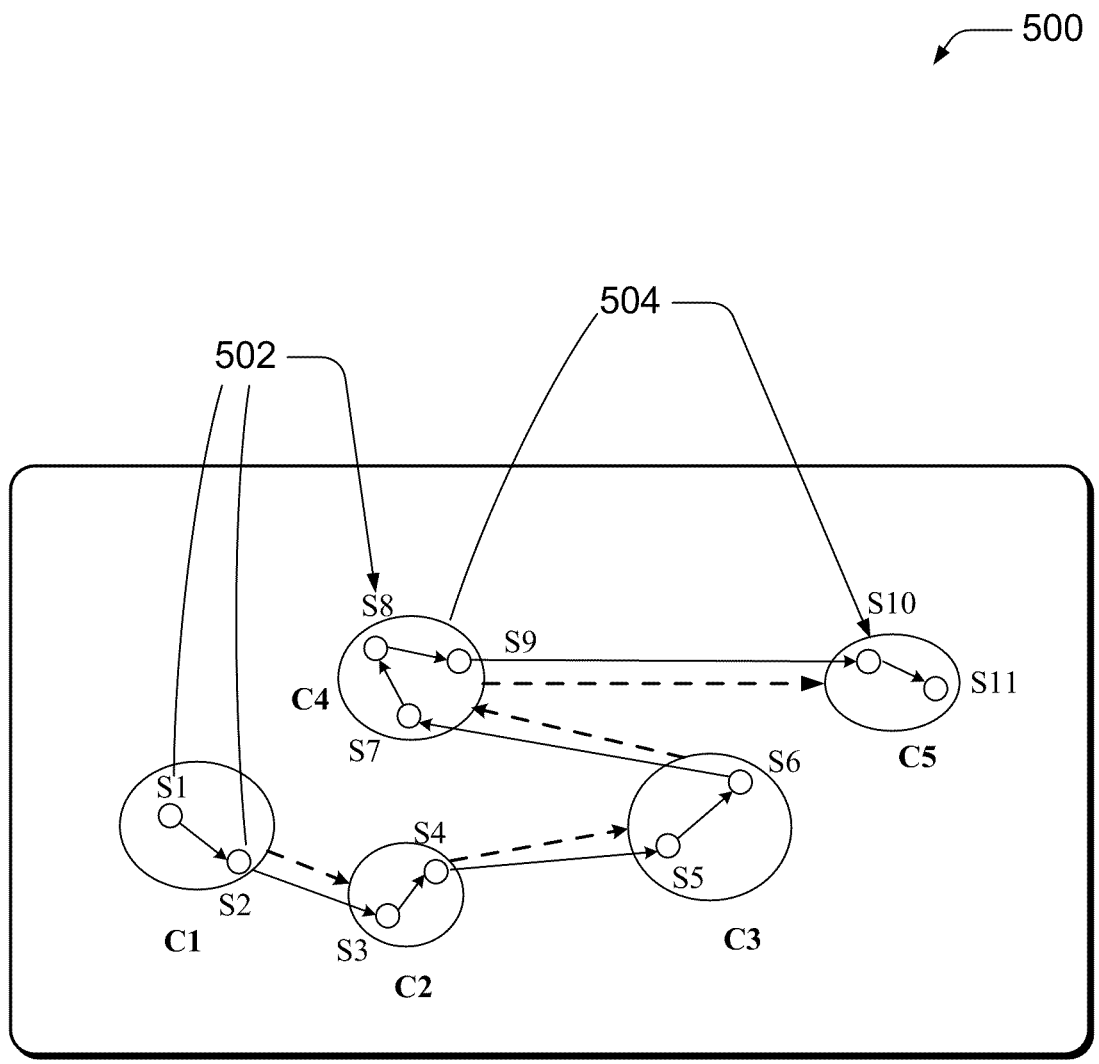
FIG. 5 illustrates an exemplary process of clustering stay points.

In addition, the stay points of each individual user are clustered to form clusters of the stay points 310. The clusters of the stay points of the individual users are further filtered. The filtering removes the top two clusters having the greatest number of stay points, from the clustering results of the individual user. The filtering protects the individual user's privacy, such as removing their home and workplace from the cluster of stay points. The stay points are reclustered after the removal. After the clustering of the stay points to form clusters, the process transforms the individual stay point sequence into a location history sequence. Each stay point is substituted by the cluster it pertains to, with arrival and departure times of the stay point retained and associated with the cluster. A diagram of the clustering of stay points of individual users is shown in FIG. 5.

In some instances, the location histories of the individual users may tend to be inconsistent, as the stay points detected from various individual users' trajectories are not identical. To address this inconsistency, the stay points that are identified from all of the individual user's trajectories are grouped into a dataset S and clustered 312. Thus, the stay points from multiple individual users' are clustered into clusters of several geographical areas 312 by a clustering algorithm.

The clustering uses a density-based clustering algorithm, such as Ordering Points To Identify the Clustering Structure (OPTICS), to cluster the individual user stay points and to cluster the multiple users' stay points into clusters of geospatial regions. OPTICS may detect clusters with irregular structures, such as a shopping street or a set of nearby restaurants. This approach helps filter out few sparsely distributed stay points, and to ensure that, each cluster has been accessed by multiple users.

The two parameters used in OPTICS are a core-distance (dc) and a minimum number of points (minPt) falling in this core-distance. The OPTICS algorithm clusters the geographical regions into clusters by grouping and identifying similar places visited by the individual users. For example, stay points of the same place are directly clustered into a density-based cluster. However, clusters with valuable semantics and irregular structures may also be detected by using OPTICS clustering method, such as a set of restaurants or travelling areas near a lake. In response to the stay points of multiple users' being clustered together into a cluster, geographical regions are identified 314 by the location correlation service 106. The stay points that are similar in coordinate location or type of classification from the multiple users may be assigned to a same cluster. These geographical regions are identified to be used for correlation.

The cluster of stay points detected from the multiple users' trajectories is defined as a collection of locations. The collection of locations L may be represented by:

$$L=\{l_0, l_1, \ldots, l_n\}$$

where $\forall 0 \leq i \leq n$, $li = \{s | s \in S\}$, $i \neq j$, $li \cap lj = \emptyset$.

After the clustering, a stay point in the user's location history may be substituted with the cluster ID. The individual user's location history may be represented as a sequence of the locations. Supposing $s_0 \in l_i$, $s_1 \in l_j$, $s_n \in l_k$, where s=stay points, the equation for individual location history shown as (1) above, may be rewritten as:

$$h = \left\{ l_i \xrightarrow{\Delta t_1} l_i \xrightarrow{\Delta t_2}, \ldots, \xrightarrow{\Delta t_{n-1}} l_k \right\}. \quad (2)$$

The individual users' location histories may be compared and integrated to infer the correlation between locations.

The model identifies a trip as a sequence of locations consecutively visited by the individual user. The trip may be represented by:

$$\text{Trip} = \left\{ l_0 \xrightarrow{\Delta t_1} l_1 \xrightarrow{\Delta t_2}, \ldots, \xrightarrow{\Delta t_{k-1}} l_k \right\}$$

where $\forall 0 \leq i \leq k$, $\Delta t_k < T_p$ (a threshold) and $li \in L$ is a stay-point-cluster ID. In general, the individual user's location history may be regarded as a collection of trips, h={Trip}, and each Trip=(li→lj→ ... ) is a sequence of locations represented by clusters of stay points.

The location correlation service 106 may use the trip data to further identify that a travel time spent between two consecutive stay points is to be used as a stay point or to be divided into two stay points. For example, if the location history of the individual user exceeds a predetermined threshold, in response, the location history of the individual user may be partitioned into more than one trip. On the other hand, if the travel time spent between two consecutive stay points does not exceed the predetermined threshold, the location history of the individual may be left as a single trip.

Next, the location correlation application 114 defines a collection of users. The collection of users U may be represented as: $U=\{u_{0,1}, \ldots, u_m\}$. $\forall 0 \leq k \leq m$, $u_k \in U$ is an individual user having a trajectory $\text{Traj}_k$, a location history $h_k$ and certain travel experience $e_k$.

The location model identifies locations based on each individual user's location history data. These locations are saved in the database 116 for further processing or may be used by the location correlation service 106.

FIG. 4 illustrates an exemplary process 400 of extracting stay points from GPS logs 402. The data collected is a sequence of time-stamped points, shown as P={p1, p2, ... pn}. Each point $p_i \in P$ contains the latitude ($p_i$·Lat), the longitude ($p_i$·Lngt), and the timestamp ($p_i$·T).

Shown in the lower diagram 404, the process connects the GPS points, p1, p2, p3, ... p9, according to their time series, into a GPS trajectory. As mentioned previously, the process extracts stay points based on the spatial and temporal values of the GPS points.

At 406, the stay point 1 is the geographical region where the individual user has remained stationary indoors at P3 for over a threshold time period. As mentioned, stay points are detected based on the time threshold within the distance threshold. For example, this type of stay point may occur when the individual user enters a building, causing the satellite signal to be lost. Once the individual returns outdoors, the satellite signal is detected again. Thus, stay point 1 is considered a geographical region (in this case, the location(s) where the signal was lost and regained) to be used in the location model.

At 408, the stay point 2 is the geographical region where the individual user may wander around within a spatial region for over a time period. The process constructs the stay point using the mean longitude and latitude of the GPS points within the region. Typical, stay points of this type occur when the individual wanders around outdoor places that detect the satellite signal, like a park, a campus, and the like.

FIG. 5 illustrates an exemplary process 500 of clustering stay points of the geographical regions of the individual user. All of the stay points, s1, s2, s3, ..., s11, associated with the individual user are put into a dataset and clustered into clusters, c1, c2, c3, ... c5, of several geographical regions. The clustering algorithm clusters the stay points by grouping and identifying similar places visited by the individual user.

Stay points are illustrated at S1, S2, .... S9 by 502. The stay point sequence $S=(s_1, s_2, s_3, \ldots, s_n)$ represents the location history of the individual user. Each stay point $s_i$ corresponds to some geographical region and a common travel sequence to be followed by individual users. There would be corresponding times for each stay point, $s_i$·arvT and $s_i$·levT of arriving and leaving a place. The process applies density-based clustering by clustering the stay points into clusters of several geographical regions.

After the clustering of the stay points, the process transforms the individual stay point sequence into a location history sequence $C=\{c_1, c_2, c_3, \ldots, c_n\}$. The clusters are illustrated at C4 and C5 by 504. Each stay point is substituted by the cluster it pertains to, with arrival and departure times of the stay point retained and associated with the cluster. For example, stay points S1 and S2 may be substituted by C1, which is the cluster that S1 and S2 are currently located.

Infer Travel Experience

FIG. 6 is a flowchart showing an exemplary process 600 for inferring travel experiences of users from their location histories. The location correlation service 106 employs an inference model to infer individual user's travel experiences from their location histories 602.

Figure 7:
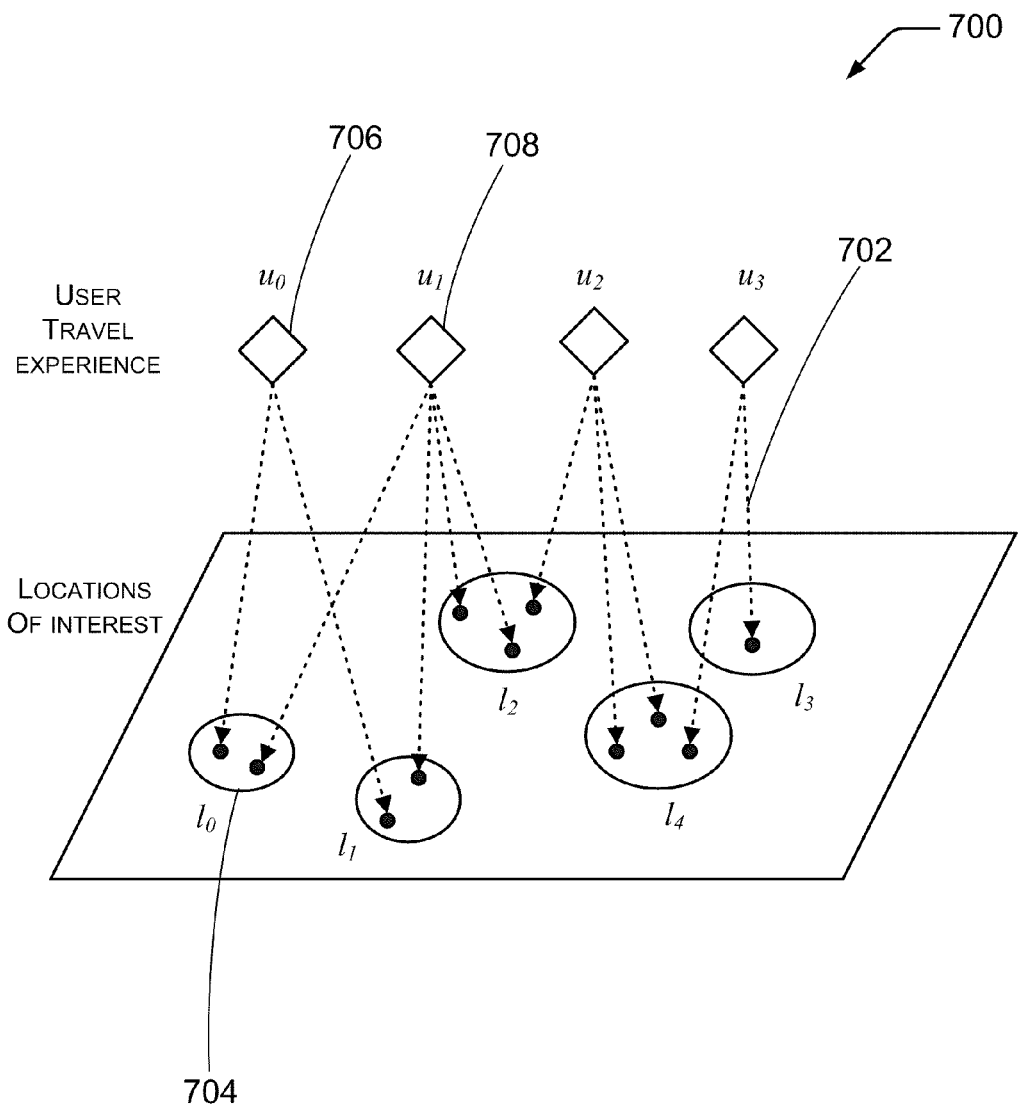
FIG. 7 illustrates an exemplary inference model used in the process of FIG. 6.

The inference model regards the individual user's stay on a location as an implicitly directed link from the user to that location, i.e., an individual user would point to many locations and a location would be pointed to by many users. The user travel experience E and the location interest $\mathcal{J}$ have a mutual reinforcement relationship. The individual user with rich travel experiences in a region would visit many interesting places in that region, and a very interesting place in that region might be accessed by many individual users with rich travel experiences. More specifically, an individual user's travel experience may be represented by the sum of the interests of the locations accessed; the interest of a location may be calculated by integrating the experiences of the individual users visiting it. Using a power iteration method, each user's travel experience and each location's interest may be calculated. A diagram of the inference of travel experience and location interest is shown in FIG. 7.

Given a collection of individual users U's location histories H, the process 600 may build an adjacent matrix M between users and locations 604. In this matrix, an item $r_{ij}$ stands for the times that ui has stayed in location $l_j$, $0 \le i <$, $0 \le j < |L|$. For instance, the matrix may be represented as:

$$M = \begin{array}{c} \\ U_0 \\ U_1 \\ U_2 \\ U_3 \end{array} \begin{array}{c} l_0\ l_1\ l_2\ l_3\ l_4 \\ \begin{vmatrix} 1 & 1 & 0 & 0 & 0 \\ 1 & 1 & 2 & 0 & 0 \\ 0 & 0 & 1 & 0 & 2 \\ 0 & 0 & 0 & 1 & 1 \end{vmatrix} \end{array}$$

Then, the mutual reinforcement relationship of the individual user travel experience $E=(e_0, e_1, \ldots, e_m)$ and location interest $\mathcal{J} = (I_0, I_1, \ldots, I_n)$ is represented 606 as follows:

$e_i = \Sigma_{l_j \in L} r_{ij} \times I_j;$ $I_j = \Sigma_{u_i \in U} r_{ji} \times e_i;$ where ei stands for ui's travel experience and Ij denotes the location interest of lj. Writing the user travel experience and location interest in the matrix form 608, is shown by:

$E = M \cdot \mathcal{J},$ $\mathcal{J} = M^T \cdot E.$

The inference model uses $\mathcal{J}$ n and En to denote location interests and travel experiences at the nth iteration. The iterative processes for generating the final results are:

$\mathcal{J}_n = M^T \cdot M \cdot \mathcal{J}_{n-1}$ $E_n = M \cdot M^T \cdot E_{n-1}$ Starting with $\mathcal{J}_0 = E_0 = (1, 1, \ldots, 1)$, the process calculates the final results using the power iteration method 610. The algorithm may perform w rounds before being converged. The computing complexity of this method is (2w|L||U|). The algorithm depicting the iterative process is shown.

| InferUserExperience (U,L,H) |
|---|
| Input: A collection of users U, their location histories H, and a collection of locations L detected from H.<br>Output: The collection of users' travel experiences E= (e0,1,...,em) .<br>1. T0=E0=(1,1,...,1);<br>2. k=1;<br>3. Do<br>4. T$_k$=M$^T$·M·Tk−1 ;<br>5. E$_k$= M·M$^T$·EK−1;<br>6. T$_k$= Tk/ Tk 1; //normalization<br>7. E$_k$= Ek/ Ek 1; //normalization<br>8. While Ek−Ek−1 1>єe or Tk−Tk−1 1>єl<br>9. Return Ek; |

Using the power iteration method, it is possible to generate the final scores for each user travel experience and location, and rank the top n interesting locations and the top k experience users in a given region.

FIG. 7 illustrates an exemplary process 700 of the inference model. Shown are user travel experience and locations of interest along the left side. A location is a cluster of stay points, $l_0, l_1, l_2, \ldots l_n$. The individual user's visit to the location is viewed as an implicitly directed link 702 that extends from the individual user $u_3$ to the location $l_3$. Shown at 704 is $l_0$, which contains two stay points, one each from $u_0$ trajectory 706 and from $u_1$ trajectory 708. This illustrates that the users access many locations, and the location is visited by many users. This is an illustration of the mutual reinforcement relationship.

Correlating Locations

FIG. 8a illustrates a flowchart showing an exemplary process 800 for correlating between the locations that have been identified through the location model. An algorithm computes the correlation between the locations by evaluating the individual user travel experience and the sequence of locations that have been visited 802.

The correlation between two locations depends on a number of users visiting the locations in a trip and rely on the individual users' travel experiences. The correlation between two locations that are continuously accessed by the individual user may be more correlated than those being visited discontinuously. The correlation between the two locations may be calculated by integrating the travel experiences of the users U' who have visited the locations in a trip in a weighted manner 804.

To calculate a correlation between locations A and B, the location correlation service 106 may use the following equation 806:

$\text{Cor}(A,B) = \Sigma_{u_k \in U'} \alpha \cdot e_k,$ where U' is the collection of users who have visited locations A and B in a trip, $e_k$ is $u_k$'s travel experience, $u_k \in U'$, and $0 < \alpha \le 1$ is a dumping factor, which may decrease as the interval between these two locations' index in a trip increases. For example, if setting $\alpha = 2^{-(|j-i|-1)}$, where i and j are indices of locations A and B and in the trip that they are pertaining to; i.e., the more discontinuity there is for the two locations that are accessed by the user, (|i−j| may be large, thus α may become small, the less contribution the user may offer to the correlation between these two locations. The location correlation service 106 determines the correlation between the locations 808.

Figure 8B:
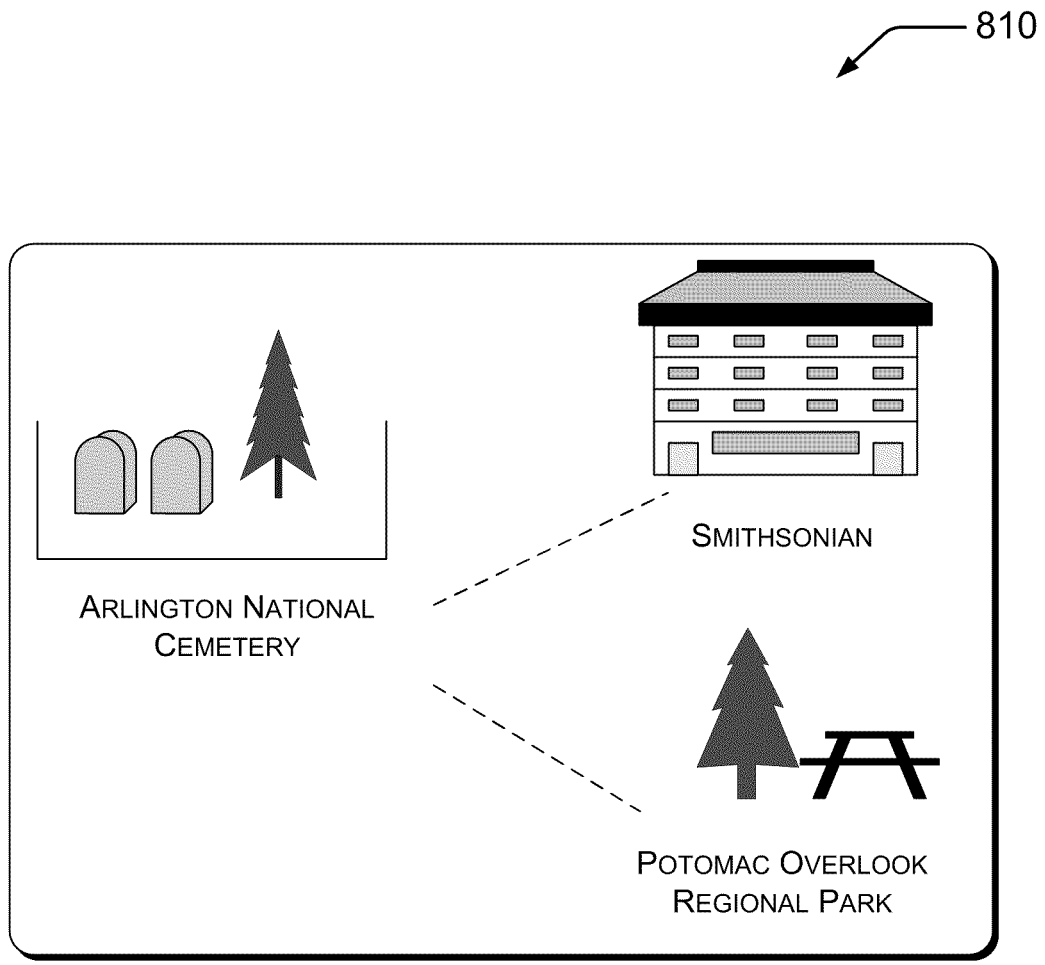
FIG. 8b illustrates an exemplary process showing correlation between the locations.

FIG. 8b shows an exemplary process of correlating the locations. The diagram 810 shows an illustration of the location correlation process 800, which calculated the correlation between locations. The correlations between locations cover category similarity and geographical distance between locations based on human behavior. Thus, correlation may be discovered from location history. The correlation enables many valuable services, such as location recommendation system, sales promotion, bus routes design, mobile tour guides, and the like.

Correlations between the locations may identify locations that are similar in type, close proximity to each other, and/or correlated from a perspective of human behavior. Human behavior identifies location histories implying key factors, such as travel time, distance, accessibility, and sequence between the locations. If the individual user visited location A and then location B, it is presumed these two locations are within distance of each other. If there are additional data indicating individual users tend to follow the sequence from A to B, this may be implied as one-way road.

For example, the correlation process shows "Smithsonian" as being highly correlated to "Arlington National Cemetery" based on mining correlation data which shows individual users tend to visit both locations. Both of these locations have been clustered as tourist attractions, and as being near each other in the DC metro area. In another correlation, the "Potomac Overlook Regional Park" is also highly correlated to "Arlington National Cemetery", based on analyzing individual user's location histories. Again, both of these are tourist attractions and located near each other. Thus, the "Smithsonian" and/or the "Potomac Overlook Regional Park" may be recommended to tourists whenever they travel to visit "Arlington National Cemetery". If the user 108 activates a map or a website for "Arlington National Cemetery", the location correlation service 106 may recommend "Potomac Overlook Regional Park". Or as mentioned, if the user's current geo-spatial position is close to "Potomac Overlook Regional Park", it may also appear as a recommended location. Otherwise, people might miss opportunities to visit sites that may be easily accessible and a place of interest with similar group identification.

In another implementation, the location correlation service 106 may find correlations among locations that are not similar in business categories but tend to follow a common travel sequence between locations. Restaurants are classified under the food category while museums and theatres are classified under entertainment. For example, the user 108 may be interested in going out to dinner at a restaurant first and then attending a show at the theatre. The location correlation service 106 recognizes the sequence and makes recommendations based on this. If the user 108 activates the map for directions for the restaurant or the theatre, the location correlation service 106 may recommend the other location. Thus, there are many advantages of correlating between locations, such as to gain knowledge from travel experiences of individuals with a higher knowledge of the region and to understand travel sequences between the locations.

Figure 9:
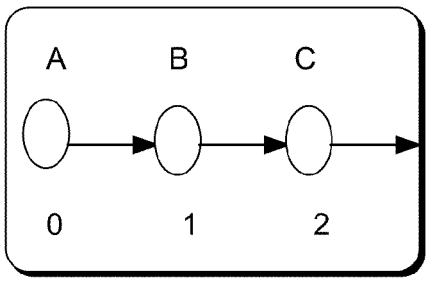
FIG. 9 illustrates an exemplary process of calculating the correlation between the locations.
Figure 9:
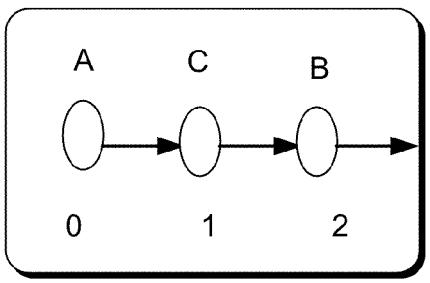
Figure 9:
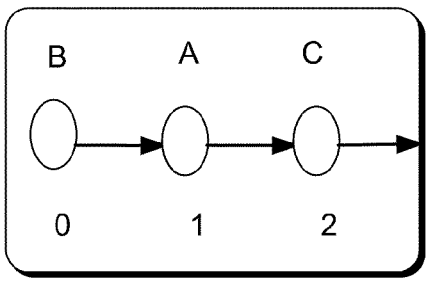

FIG. 9 illustrates an exemplary process 900 for calculating the correlation between the locations. Shown are three users (u1, 2, u3) who access three locations (A, B, C). The three users may access the locations in different manners to illustrate three trips (Trip1, Trip2, Trip3). As shown in FIG. 9, the number shown below each node denotes the index of this node in the sequence. The sequence for u1 on Trip1 may be A, B, C at 902; the sequence for u2 on Trip2 may be A, C, B at 904; and the sequence for u3 on Trip3 may include B, A, C at 906.

Using the correlation equation shown below:

$$Cor(A,B) = \Sigma_{u_k \in U} \alpha \cdot e_k,$$

and with information from Trip1, the location correlation application 114 may calculate Cor(A,B)=e1 and Cor(B,C)=e1, since these locations have been consecutively accessed by u1 (i.e., α=1). However, Cor(A,)=½·e1 (i.e., α= $2^{-(|2-0|-1)}$=½) as u1 traveled to B before visiting C. Thus, the correlation between locations A and C from Trip1 may not be as strong as the correlation between A and B, as they are not consecutively visited by u1. Thus, the learnings generated from the correlation of Cor(A,)=e2, Cor(C,B)=e2, Cor(A,B)=½·e2 from Trip2, and inferring Cor(B,A)=e3, Cor(A,C)=e3, Cor(B,C)=½·e3 from Trip3. Later, the location correlation application 114 integrates these correlations that are inferred from each individual user's trips and obtain the following results:

$$Cor(A, B) = e_1 + \frac{1}{2} \cdot e_2;$$

$$Cor(A, C) = \frac{1}{2} \cdot e_1 + e_2 + e_3;$$

$$Cor(B, C) = e_1 + \frac{1}{2} \cdot e_3;$$

-continued $$Cor(C, B) = e_2;$$

$$Cor(B, A) = e_3.$$

Shown below is the location correlation algorithm for inferring correlation between locations. In the algorithm, b is a constant, which is set to 2. |Trip| stands for the number of locations contained in the Trip and Tri[i] represents the ith location in Trip. For example, regarding Trip1, |Trip|=3, Trip[0]=A (the first location), Trip [1]=B, Cor(Tri[0], Trip[1])=Cor(A,B).

---

CalculateLocationCorrelation (L,E,H,Tp)

---

Input: A collection of users' travel experiences E and their location histories H, location collection L, and a threshold Tp for trip partition.
Output: A matrix Cor describing the correlation between locations.
1. Foreach location lp∈L Do
2. Foreach location lp∈L,p≠q Do
3.     Cor lp,lq =0;    //initialize the location correlation
4. Foreach hk∈H Do    //each user's location history
5.     TP=TripPartition(hk,Tp);    //partition uk's location history into trips
6.     Foreach Trip in TP Do
7.         For i=0;i< Trip ;i++ // ith location contained in Trip
8.         For j=i+1;j< Trip ;j++
9.             α=b−(j−i−1) ; // dumping factor, b is a constant
10.         Cor Trip[i],Trip[j] +=α·ek ;
11. Foreach lp∈L Do
12.     Foreach lq∈L,p≠q Do //normalization
13.         Cor (lp,lq) =Cor (lp,lq) /|| Cor (lp,l0) ,...,Cor (lp,l$_{|Z|-1}$)|| $_1$
11. Return Cor;

---

In an implementation, there may be n trips in a dataset and the average length of a trip is m. The mining algorithm takes $$O\left(2|L|^2 + \frac{m(m-1)}{2} \cdot n\right)$$

time. So, the overall computing complexity F of this approach is the combination of inferring user travel experience and calculating the location correlation, i.e., $$Q = O\left(2w|L||U| + 2|L|^2 + \frac{m(m-1)}{2} \cdot n\right).$$

The correlation results may be mined. Shown below is an algorithm for mining the correlation As mentioned previously, lines 2-4 illustrate detecting stay points and formulating location histories into a sequence of stay points. Lines 5 and 6 illustrate the clustering of all of the users' stay points. Lines 7 and 8 illustrate representing the location history by a sequence of stay point clusters called locations. Lines 9 and 10 show the iterative model being used to learn each user's travel experience. And Line 11 illustrate the algorithm is used to calculate the correlation.

---

MiningLocationCorrelation (U, TRAJ, Tr, Dr,Tp)

---

Input: A collection of users U and their trajectories TRAJ= Trajk ,
a time threshold Tr and a distance threshold Dr for stay point detection, -continued MiningLocationCorrelation (U, TRAJ, Tr, Dr,Tp)

and a Tp for trip partition.
Output: A matrix Cor of correlation between each pair of locations.
1. S=ϕ; H= ϕ; //temporal variables
2. Foreach uk∈U do
3.    ST=StayPointDetection(Trajk, Tr, Dr); //
4.    hk = LocHistPresent(ST); //a sequence of stay points
5.    S=S ∪ST; // a collection of all users' stay points
6. L = Clustering(S);    //detect locations by clustering the stay points
7. Foreach uk∈U do
8.    hk = LocHistRepresent(❷ k,L); //a sequence of locations
9.    H= H ∪hk, //a collection of all users' location histories
10. E=InferUserExperience(U,L,H);
11. Cor=CalculateLocationCorrelation(L,E,H,Tp);
12. Return Cor.

Once the results have been mined, they may be stored in the database 116. As discussed above, certain acts in processes 300, 600, and 800 need not be performed in the order described, may be modified and/or may be omitted entirely, depending on the circumstances.

Exemplary Server Implementation

Figure 10:
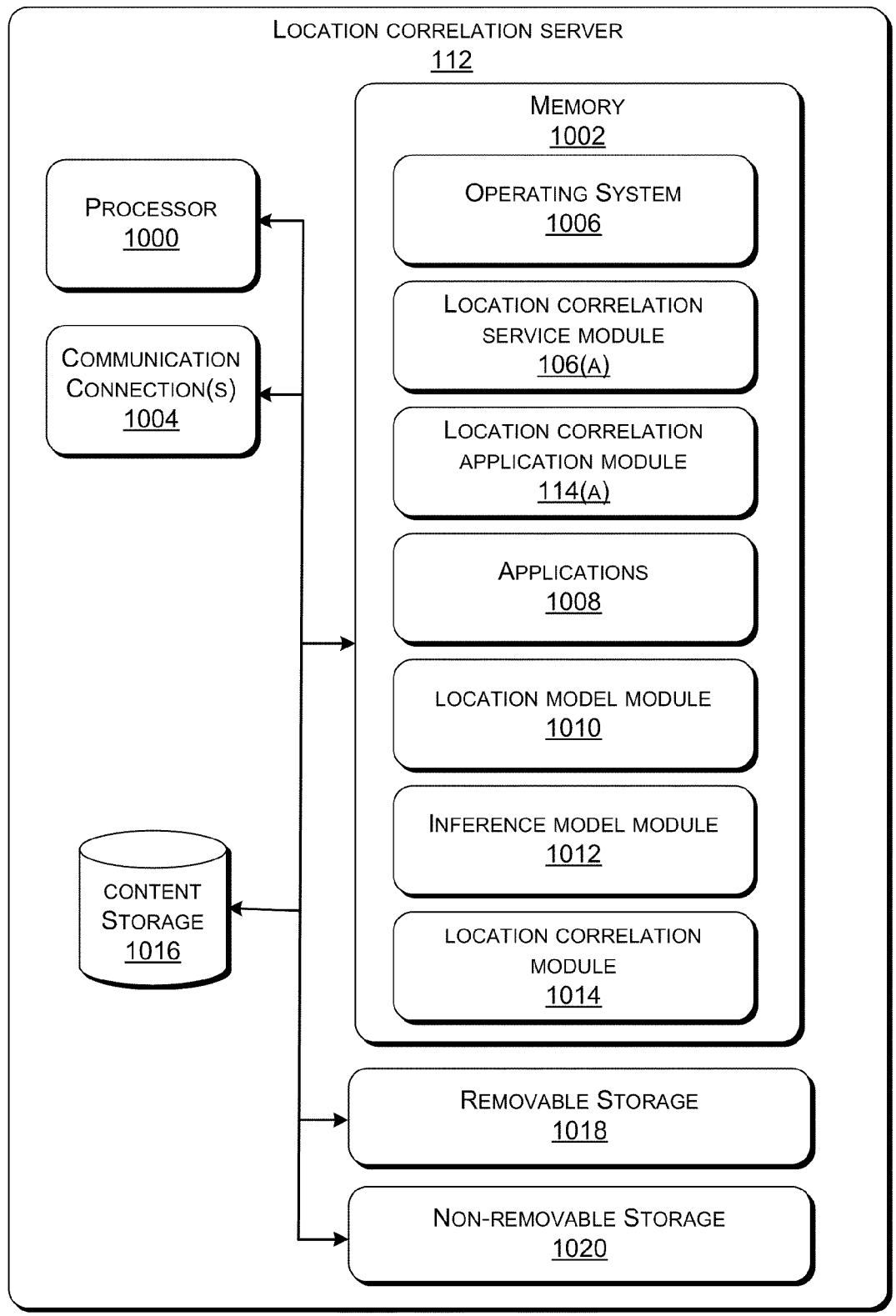
FIG. 10 is a block diagram showing an exemplary location correlation server usable with the environment of FIG. 1.

FIG. 10 is a block diagram showing an exemplary server usable with the environment of FIG. 1. The server 112 may be configured as any suitable system capable of services, which includes, but is not limited to, implementing the location correlation service 106 for online services, such as providing recommendations. In one exemplary configuration, the server 112 comprises at least one processor 1000, a memory 1002, and a communication connection(s) 1004. The communication connection(s) 1004 may include access to a wide area network (WAN) module, a local area network module (e.g., WiFi), a personal area network module (e.g., Bluetooth), and/or any other suitable communication modules to allow the server 112 to communicate over the network(s) 104.

Turning to the contents of the memory 1002 in more detail, the memory 1002 may store an operating system 1006, the module for the location correlation service 106(*a*), the module for the location correlation application 114(*a*), and one or more applications 1008 for implementing all or a part of applications and/or services using the location correlation service 106.

The one or more other applications 1008 or modules may include an email application, online services, a calendar application, a navigation module, a game, and the like. The memory 1002 in this implementation may also include a location model module 1010, an inference model module 1012, and a location correlation algorithm or module 1014.

The location model module 1010 transforms and processes the data to create the location model. The process includes collecting GPS logs, parsing trajectories from the log data, extracting stay points from the trajectories, clustering stay points of individual users and of multiple users, and identifying locations.

The memory 1002 in this implementation may also include the inference model module 1012. The module 1012 integrates the travel experience of the user with locations of interest in locations visited by the individual user. The module 1012 builds a matrix and performs an iterative process for generating results based on inferring users travel experiences and locations.

The location correlation algorithm or module 1014 determines a correlation between the locations that have been identified by the location model. The location correlation module 1014 performs calculations by evaluating users' travel experiences, their location histories, location collection, and a threshold for trip partition. Based on this input, the module 1014 determines a correlation between the locations.

The server 112 may include a content storage 1016 to store the collection of GPS logs, trajectories, stay points, clusters, location model, correlation results, and the like. Alternatively, this information may be stored on database 116.

The server 112 may also include additional removable storage 1018 and/or non-removable storage 1020. Any memory described herein may include volatile memory (such as RAM), nonvolatile memory, removable memory, and/or non-removable memory, implemented in any method or technology for storage of information, such as computer-readable instructions, data structures, applications, program modules, emails, and/or other content. Also, any of the processors described herein may include onboard memory in addition to or instead of the memory shown in the figures. The memory may include storage media such as, but not limited to, random access memory (RAM), read only memory (ROM), flash memory, optical storage, magnetic disk storage or other magnetic storage devices, or any other medium which can be used to store the desired information and which can be accessed by the respective systems and devices.

The server as described above may be implemented in various types of systems or networks. For example, the server may be a part of, including but is not limited to, a client-server system, a peer-to-peer computer network, a distributed network, an enterprise architecture, a local area network, a wide area network, a virtual private network, a storage area network, and the like.

Various instructions, methods, techniques, applications, and modules described herein may be implemented as computer-executable instructions that are executable by one or more computers, servers, or telecommunication devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method implemented at least partially by a processor, the method comprising:
   collecting global positioning system (GPS) logs of geospatial locations of multiple users captured over time;
   constructing, using the processor, a location model for each individual user of the multiple users by:
      identifying trajectories representing trips of the individual user based on the GPS logs of geospatial locations captured over time;
      extracting stay points from the trajectories, each stay point representing a geographical region where the individual user stayed over a time threshold within a distance threshold; and
      formulating a location history for the individual user based on a sequence of the extracted stay points; and determining a correlation between locations by:
  identifying, based on the location histories of the multiple users, a collection of users that have visited the locations; and
  integrating travel experiences of the collection of users in a weighted manner, wherein a contribution of each travel experience is weighted based on a sequence in which the locations were visited in a trip and a number of intervening locations in the trip.

2. The method of claim 1, wherein the GPS logs include a sequence of GPS points representing geospatial locations of the individual user captured over a time period, and wherein the GPS points each contain a date, a time, a longitude, and a latitude.

3. The method of claim 1, further comprising:
  clustering the stay points of geographical regions for the individual user to form clusters of stay points; and
  removing a top two clusters of stay points having a greatest number of stay points to eliminate the geographical regions that are private to the individual user.

4. The method of claim 1, further comprising:
  clustering the stay points that are extracted into clusters corresponding to the geographical regions based on a density-based clustering algorithm; and
  detecting clusters with irregular structures.

5. The method of claim 1, further comprising clustering the stay points that are extracted to form clusters by using a density-based clustering algorithm, the density-based clustering algorithm based at least in part on a core-distance and a minimum number of stay points falling within the core-distance.

6. The method of claim 1, further comprising:
  creating a dataset of location histories of the multiple users;
  partitioning the dataset of the multiple users into clusters by employing a density-based clustering algorithm;
  assigning the stay points in the dataset into clusters of geographical regions that are similar;
  substituting a stay point in the location history of the individual user with an identification of a cluster; and
  identifying locations of geographical regions based on the clustering of the stay points.

7. The method of claim 1, further comprising:
  identifying that a travel time spent between two consecutive stay points in the location history of the individual user exceeds a predetermined threshold and, in response, partitioning the location history of the individual user into more than one trip; or
  identifying that the travel time spent between the two consecutive stay points does not exceed the predetermined threshold and, in response, leaving the location history of the individual as a trip.

8. The method of claim 1, further comprising presenting a user with a recommendation, the recommendation based at least in part on the correlation between the locations, the recommendation being based on a user's present geospatial location, a prediction of the user's interest in a location, locations within a threshold travel time, locations within a predetermined distance from the user's present geospatial location, or a combination thereof.

9. One or more computer-readable media encoded with instructions that, when executed by a processor, perform acts comprising:
  accessing a location model constructed from global positioning system (GPS) logs of geospatial locations to identify locations for calculating a correlation between identified locations;
  calculating a correlation between the identified locations from the location model based on using an algorithm for:
    identifying a collection of individual users visiting the identified locations in a trip; and
    integrating the travel experiences of the collection of individual users who have visited the identified locations in a weighted manner, wherein a contribution of each travel experience is weighted based on a sequence in which the identified locations were visited in a trip and a number of intervening locations in the trip;
  identifying a recommended location based on the correlation between the identified locations from location histories of the individual users;
  detecting a user's present geospatial location or accessing a geospatial location on a map; and
  recommending the recommended location based on detecting the user's present geospatial location or based on the geospatial location accessed on the map, wherein the recommended location is within at least one of:
    a threshold travel time, or
    a predetermined distance from the geospatial location.

10. The one or more computer-readable media of claim 9, wherein the integrating the travel experiences comprises employing an inference model to infer the travel experiences by:
  building a matrix between individual users and locations visited by the individual users;
  representing a relationship between the travel experiences of the individual user and location interests of the locations visited; and
  calculating the travel experiences and the location interests in an iterative process to determine the travel experiences.

11. The one or more computer-readable media of claim 9, further comprising building a location model for each individual user by:
  retrieving global positioning system (GPS) logs of geospatial locations of multiple users captured over time; and
  constructing a location model for each individual user of the multiple users by:
    identifying trajectories representing trips of the individual user based on the GPS logs of geospatial locations captured over time;
    extracting stay points from the trajectories, each stay point representing a geographical region where the individual user stayed over a time threshold within a distance threshold; and
    formulating a location history for the individual user based on a sequence of the extracted stay points.

12. The one or more computer-readable media of claim 11, further comprising:
  clustering the stay points of geographical regions for the individual user to form clusters of stay points;
  removing a top two clusters of stay points having a greatest number of stay points to eliminate the geographical regions that are private to the individual user; and
  reclustering the stay points after the top two clusters have been removed.

13. The one or more computer-readable media of claim 9, further comprising:
  creating a dataset of location histories of multiple users;
  partitioning the dataset of the multiple users into clusters by employing a density-based clustering algorithm;
  assigning the stay points in the dataset into clusters of geographical regions that are closely related in distance;

substituting a stay point in the location history of the individual user with an identification of a cluster; and identifying the identified locations of geographical regions based on the clustering of the stay points.

14. The one or more computer-readable media of claim 9, wherein the GPS logs include a sequence of GPS points representing geospatial locations of the individual user captured over a time period, and wherein the GPS points each contain a date, a time, a longitude, and a latitude.

15. The one or more computer-readable media of claim 9, further comprising:

identifying that a travel time spent between two consecutive stay points in the location history of the individual user exceeds a predetermined threshold and, in response, partitioning the location history of the individual user into more than one trip; or identifying that the travel time spent between the two consecutive stay points does not exceed the predetermined threshold and, in response, leaving the location history of the individual as a trip.

16. A system comprising:

a memory;

a processor coupled to the memory:

a location model module stored in the memory and executable on the processor to construct a location model for identifying locations visited by a collection of individual users, the locations based on location histories of multiple users captured over time through global positioning system (GPS) logs; and a location correlation module stored in the memory and executable on the processor to compute a correlation between the locations visited by the collection of individual users, by integrating travel experiences of the collection of individual users in a weighted manner, wherein a contribution of each travel experience is weighted based on a sequence in which the locations were visited in a trip and a number of intervening locations in the trip.

17. The system of claim 16, further comprising:

a location correlation application module stored in the memory and executable on the processor to provide a recommendation, the recommendation based at least in part on the correlation between the locations visited by the collection of individual users, the recommendation being based, at least in part, on at least one of:

a user's present geospatial location, a prediction of the user's interest in a location, locations within a threshold travel time, or locations within a predetermined distance of the user's present geospatial location.

18. The system of claim 16, further comprising:

an inference model module to infer the travel experiences of the individual user by:

building a matrix between individual users and locations visited by the individual users;

representing a relationship between the travel experiences of the individual user and location interests of the locations visited; and calculating the travel experiences and the location interests for each location in an iterative process to determine the travel experiences.

19. The system of claim 16, further comprising the location model module stored in the memory and executable on the processor to construct the location model by:

extracting stay points from the GPS logs, each stay point representing a geographical region where the individual user stayed over a time threshold within a distance threshold;

partitioning a dataset of the multiple users into clusters by employing a density-based clustering algorithm;

assigning the stay points in the dataset into clusters of geographical regions;

substituting a stay point in the location history of the individual user with an identification of a cluster; and identifying locations of geographical regions based on the clustering of the stay points.

20. The method of claim 1, wherein the contribution of a travel experience in which a first location and a second location are consecutively visited is higher than the contribution of a travel experience in which at least one other location is visited after the first location is visited but before the second location is visited.

* * * * *